(12) United States Patent
Yerramalli et al.

(10) Patent No.: US 12,010,668 B2
(45) Date of Patent: Jun. 11, 2024

(54) TECHNIQUES FOR SUPPORTING WIDEBAND ARRAY OPERATION

(71) Applicant: QUALCOMM Incorporated, San Diego, CA (US)

(72) Inventors: Srinivas Yerramalli, Hyderabad (IN); Vasanthan Raghavan, West Windsor Township, NJ (US); Arumugam Chendamarai Kannan, San Diego, CA (US); Vinay Chande, San Diego, CA (US); Junyi Li, Fairless Hills, PA (US); Giovanni Chisci, San Diego, CA (US); Xiaoxia Zhang, San Diego, CA (US); Tao Luo, San Diego, CA (US); Jing Sun, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/357,342

(22) Filed: Jun. 24, 2021

(65) Prior Publication Data

US 2022/0015100 A1    Jan. 13, 2022

Related U.S. Application Data

(60) Provisional application No. 63/049,101, filed on Jul. 7, 2020.

(51) Int. Cl.
*H04W 72/0453* (2023.01)
*H04B 7/08* (2006.01)
(Continued)

(52) U.S. Cl.
CPC ...... *H04W 72/0453* (2013.01); *H04B 7/0888* (2013.01); *H04L 5/0094* (2013.01);
(Continued)

(58) Field of Classification Search
CPC .......... H04W 72/0453; H04W 56/001; H04W 72/042; H04W 72/046; H04B 7/0888;
(Continued)

(56) References Cited

U.S. PATENT DOCUMENTS

| 10,305,655 B2 * | 5/2019 | Chen ............... H04L 5/0048 |
| 2012/0294221 A1 * | 11/2012 | Choi ............... H04L 5/0044 |
| | | 370/312 |

(Continued)

FOREIGN PATENT DOCUMENTS

| WO | WO-2014116928 A1 * | 7/2014 | ........... H04B 7/0417 |
| WO | WO-2017023232 A1 * | 2/2017 | ........... H04B 17/309 |
| WO | WO-2019022657 A1 | 1/2019 | |

OTHER PUBLICATIONS

Partial International Search Report—PCT/US2021/039149—ISA/EPO—Oct. 12, 2021 (205509WO).
(Continued)

*Primary Examiner* — Bob A Phunkulh
(74) *Attorney, Agent, or Firm* — Holland & Hart LLP

(57) ABSTRACT

Methods, systems, and devices for wireless communications are described. To support a reliable array response for wideband communications, a base station may configure a set of transmission instances for a set of signals distributed across a wideband carrier bandwidth. At least one transmission instance of the set of transmission instances may be configured in each sub-band of the carrier bandwidth. The base station may transmit the set of signals in the configured transmission instances to a user equipment (UE). The UE may receive the set of signals distributed across the carrier bandwidth and may measure, for the signals, a set of signal measurements corresponding to the set of sub-bands. Based on the signal measurements, the UE may determine a set of communication beams for the set of sub-bands. Using one or more of the determined communication beams, the UE may communicate with the base station in the carrier bandwidth.

30 Claims, 16 Drawing Sheets

(51) Int. Cl.
*H04L 5/00* (2006.01)
*H04L 27/26* (2006.01)
*H04W 56/00* (2009.01)
*H04W 72/044* (2023.01)
*H04W 72/23* (2023.01)

(52) U.S. Cl.
CPC .... *H04L 27/26025* (2021.01); *H04L 27/2657* (2013.01); *H04W 56/001* (2013.01); *H04W 72/046* (2013.01); *H04W 72/23* (2023.01); *H04L 5/001* (2013.01); *H04L 5/0048* (2013.01)

(58) Field of Classification Search
CPC ............... H04B 7/0695; H04L 5/0094; H04L 27/26025; H04L 27/2657; H04L 5/001; H04L 5/0048; H04L 27/2613; H04L 5/0058; H04L 5/0023
See application file for complete search history.

(56) References Cited

U.S. PATENT DOCUMENTS

| | | |
|---|---|---|
| 2018/0020457 A1* | 1/2018 | Noh ................... H04W 52/241 |
| 2019/0150124 A1* | 5/2019 | Nogami ................ H04W 72/23 |
| | | 370/330 |
| 2019/0260452 A1 | 8/2019 | Zhang et al. |
| 2020/0044801 A1* | 2/2020 | Wang ................... H04L 5/0094 |
| 2020/0203849 A1* | 6/2020 | Lim ......................... H01P 5/12 |
| 2020/0228182 A1* | 7/2020 | Nilsson ................ H04B 7/0647 |
| 2021/0176654 A1* | 6/2021 | Pezeshki ........... H04W 72/0453 |

OTHER PUBLICATIONS

International Search Report and Written Opinion—PCT/US2021/039149—ISA/EPO—Dec. 3, 2021 (205509WO).

* cited by examiner

TECHNIQUES FOR SUPPORTING WIDEBAND ARRAY OPERATION

CROSS REFERENCE

The present application for patent claims the benefit of U.S. Provisional Patent Application No. 63/049,101 by YERRAMALLI et al., entitled "TECHNIQUES FOR SUPPORTING WIDEBAND ARRAY OPERATION," filed Jul. 7, 2020, assigned to the assignee hereof, and expressly incorporated by reference herein.

FIELD OF TECHNOLOGY

The following relates generally to wireless communications and more specifically to techniques for supporting wideband array operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support wideband array operations. That is, some wireless communications systems may support operations using high transmission bandwidth-to-center frequency ratios (e.g., greater than five percent, ten percent, or some other threshold percentage). As a result, communication devices may operate using large carrier bandwidths. Additionally, these communication devices may support communications in a millimeter band (e.g., from 30 gigahertz (GHz) to 300 GHz). In some cases, wideband communications—in the millimeter band or other radio frequency spectrum bands—may suffer decreased reliability due to a change in an array response across a carrier bandwidth. For example, a wireless device may optimize wideband communications for a center frequency of the carrier bandwidth using a communication beam. However, signals transmitted at various frequencies across the carrier bandwidth (e.g., relatively far from the center frequency) may suffer performance degradation and decreased reliability due to the large carrier bandwidth and the communication beam operating differently at different frequencies.

SUMMARY

The described techniques relate to improved methods, systems, devices, and apparatuses that support techniques for supporting wideband array operation. Generally, the described techniques provide for a reliable array response across a wideband carrier bandwidth. In some wireless communications systems supporting wideband operations, a base station may configure a set of transmission instances for a set of signals distributed across a carrier bandwidth (e.g., for a wideband carrier including a set of sub-bands). At least one transmission instance of the set of transmission instances may be configured in each sub-band of the set of sub-bands for the carrier bandwidth. The base station may transmit the set of signals in the configured transmission instances to a UE, for example, using a set of transmit beams. The signals may be examples of synchronization signal blocks (SSBs), channel state information reference signals (CSI-RSs), or any other beam-specific signals.

The UE may receive the set of signals distributed across the carrier bandwidth and may measure, for the signals, a set of signal measurements corresponding to the set of sub-bands. Based on the signal measurements, the UE may determine a set of communication beams (e.g., sub-band-specific beams) for the set of sub-bands. The UE may communicate with the base station in the carrier bandwidth based on the determined set of communication beams. For example, if an array response varies significantly (e.g., greater than a threshold amount) across the carrier bandwidth for one or more of the communication beams, the UE may communicate with the base station using different communication beam pairs in different sub-bands of the carrier bandwidth. Alternatively, if the array response remains relatively consistent (e.g., varies less than the threshold amount) across the carrier bandwidth, the UE may communicate with the base station using a same communication beam pair for the entire carrier bandwidth.

A method for wireless communications at a UE is described. The method may include receiving, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band, measuring, for the set of signals, a set of signal measurement values corresponding to the set of sub-bands, determining a set of communication beams for the set of sub-bands based on the set of signal measurement values, where a first communication beam of the set of communication beams is determined for the first sub-band and a second communication beam different from the first communication beam is determined for the second sub-band, and communicating with the base station in the carrier bandwidth based on the determined set of communication beams.

An apparatus for wireless communications at a UE is described. The apparatus may include a processor, memory coupled with the processor, and instructions stored in the memory. The instructions may be executable by the processor to cause the apparatus to receive, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band, measure, for the set of signals, a set of signal measurement values corresponding to the set of sub-bands, determine a set of communication beams for the set of sub-bands based on the set of signal measurement values, where a first communication beam of the set of communication beams is determined for the first sub-band and a second communication beam different from the first communication beam is determined for the second sub-band, and communicate with the base station in the carrier bandwidth based on the determined set of communication beams.

Another apparatus for wireless communications at a UE is described. The apparatus may include means for receiving, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band, measuring, for the set of signals, a set of signal measurement values corresponding to the set of sub-bands, determining a set of communication beams for the set of sub-bands based on the set of signal measurement values, where a first communication beam of the set of communication beams is determined for the first sub-band and a second communication beam different from the first communication beam is determined for the second sub-band, and communicating with the base station in the carrier bandwidth based on the determined set of communication beams.

A non-transitory computer-readable medium storing code for wireless communications at a UE is described. The code may include instructions executable by a processor to receive, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band, measure, for the set of signals, a set of signal measurement values corresponding to the set of sub-bands, determine a set of communication beams for the set of sub-bands based on the set of signal measurement values, where a first communication beam of the set of communication beams is determined for the first sub-band and a second communication beam different from the first communication beam is determined for the second sub-band, and communicate with the base station in the carrier bandwidth based on the determined set of communication beams.

Some examples of the method, apparatuses, and non-transitory computer-readable medium described herein may further include operations, features, means, or instructions for comparing a first signal measurement value of the set of signal measurement values for the first signal to a second signal measurement value of the set of signal measurement values for the second signal and selecting one or more communication beams of the set of communication beams for communicating in the carrier bandwidth based on the comparing, where the communicating with the base station in the carrier bandwidth may be further based on the selected one or more communication beams.

In some examples of the method, apparatuses, and non-transitory computer-readable medium described herein, the comparing may include operations, features, means, or instructions for calculating a difference value between the first signal measurement value and the second signal measurement value and comparing the difference value to a threshold value for beam squint, where selecting the one or more communication beams may include operations, features, means, or instructions for selecting a communication beam for the carrier bandwidth if the difference value fails to satisfy the threshold value for beam squint and selecting the one or more communication beams may include operations, features, means, or instructions for selecting the set of communication beams for the set of sub-bands if the difference value satisfies the threshold value for beam squint.

Some examples of the method, apparatuses, and non-transitory computer-readable medium described herein may further include operations, features, means, or instructions for receiving, from the base station, repetitions of the set of signals across the carrier bandwidth for a time period, determining that the difference value between the first signal measurement value and the second signal measurement value changes less than a threshold amount during the time period, receiving, from the base station, a repeated first signal in the first sub-band in a subsequent slot, measuring, for the repeated first signal, the first signal measurement value in the subsequent slot, and deriving the second signal measurement value in the subsequent slot based on the difference value and determining that the difference value changes less than the threshold amount.

Some examples of the method, apparatuses, and non-transitory computer-readable medium described herein may further include operations, features, means, or instructions for receiving, from the base station, a configuration message indicating for the UE to communicate using sub-band-specific communication beams and selecting the set of communication beams for communicating in the set of sub-bands of the carrier bandwidth based on the configuration message.

In some examples of the method, apparatuses, and non-transitory computer-readable medium described herein, the configuration message includes a radio resource control (RRC) message, a medium access control control element (MAC-CE), a downlink control information (DCI) message, or a combination thereof.

Some examples of the method, apparatuses, and non-transitory computer-readable medium described herein may further include operations, features, means, or instructions for transmitting, to the base station, a measurement report including respective information for each sub-band of the set of sub-bands based on the determined set of communication beams for the set of sub-bands.

In some examples of the method, apparatuses, and non-transitory computer-readable medium described herein, the measurement report includes a preferred communication beam for each sub-band of the set of sub-bands, an order of preference for communication beams for each sub-band of the set of sub-bands, a preferred communication beam for one or more combinations of sub-bands of the set of sub-bands, an order of preference for communication beams for one or more combinations of sub-bands of the set of sub-bands, an order of preference for communication beams for the carrier bandwidth, an order of preference for the set of sub-bands, or a combination thereof.

Some examples of the method, apparatuses, and non-transitory computer-readable medium described herein may further include operations, features, means, or instructions for receiving, from the base station, a configuration message indicating the set of sub-bands configured for the carrier bandwidth, where determining the set of communication beams may be based on the set of sub-bands configured for the carrier bandwidth.

Some examples of the method, apparatuses, and non-transitory computer-readable medium described herein may further include operations, features, means, or instructions for selecting, from the determined set of communication beams, a subset of communication beams for communicating on a set of physical channels, where the first communication beam may be selected for a first physical channel of the set of physical channels and the second communication beam may be selected for a second physical channel of the set of physical channels.

Some examples of the method, apparatuses, and non-transitory computer-readable medium described herein may further include operations, features, means, or instructions for identifying a resource occasion configured for a physical channel of the set of physical channels, where a communication beam may be selected for the physical channel based on the resource occasion configured for the physical channel and a sub-band of the set of sub-bands corresponding to the resource occasion.

In some examples of the method, apparatuses, and non-transitory computer-readable medium described herein, the resource occasion may be identified for the physical channel based on remaining minimum system information (RMSI), other system information (OSI), or a combination thereof, and the physical channel includes a physical control channel, a physical data channel, a physical random access channel (PRACH), a physical feedback channel, or a combination thereof.

In some examples of the method, apparatuses, and non-transitory computer-readable medium described herein, the set of signals includes a set of SSBs, the receiving may further include operations, features, means, or instructions for receiving multiple sets of SSB beams across the carrier bandwidth using a set of receive beams, where a first set of SSB beams of the multiple sets of SSB beams may be received in the first sub-band and a second set of SSB beams of the multiple sets of SSB beams may be received in the second sub-band, and the determining may further include operations, features, means, or instructions for selecting a receive beam of the set of receive beams for each SSB beam of the multiple sets of SSB beams for each sub-band of the set of sub-bands.

In some examples of the method, apparatuses, and non-transitory computer-readable medium described herein, the communicating further may include operations, features, means, or instructions for communicating with the base station in the carrier bandwidth using a sub-band-specific receive beam of the set of receive beams, a sub-band-specific SSB beam of the multiple sets of SSB beams, or a combination thereof based on the selecting.

In some examples of the method, apparatuses, and non-transitory computer-readable medium described herein, a first SSB sequence for the first set of SSB beams received in the first sub-band may be the same as a second SSB sequence for the second set of SSB beams received in the second sub-band.

In some examples of the method, apparatuses, and non-transitory computer-readable medium described herein, a first SSB sequence for the first set of SSB beams received in the first sub-band may be different from a second SSB sequence for the second set of SSB beams received in the second sub-band.

In some examples of the method, apparatuses, and non-transitory computer-readable medium described herein, the first SSB sequence may be based on the first sub-band, and the second SSB sequence may be based on the second sub-band.

Some examples of the method, apparatuses, and non-transitory computer-readable medium described herein may further include operations, features, means, or instructions for monitoring for the multiple sets of SSB beams across the carrier bandwidth based on one or more raster frequencies for the carrier bandwidth, where receiving the multiple sets of SSB beams may be based on the monitoring.

Some examples of the method, apparatuses, and non-transitory computer-readable medium described herein may further include operations, features, means, or instructions for identifying the set of sub-bands based on the received multiple sets of SSB beams, where determining the set of communication beams may be based on the identified set of sub-bands.

In some examples of the method, apparatuses, and non-transitory computer-readable medium described herein, the set of signals includes a set of CSI-RSs.

In some examples of the method, apparatuses, and non-transitory computer-readable medium described herein, the receiving may further include operations, features, means, or instructions for receiving multiple sets of CSI-RSs across the carrier bandwidth using a receive beam, where a first set of CSI-RSs of the multiple sets of CSI-RSs may be received in the first sub-band from a set of transmit beams at the base station and a second set of CSI-RSs of the multiple sets of CSI-RSs may be received in the second sub-band from the set of transmit beams at the base station, the determining may further include operations, features, means, or instructions for selecting a set of transmit beams of the set of transmit beams for the set of sub-bands, where the method, apparatuses, and non-transitory computer-readable medium described herein may further include operations, features, means, or instructions for transmitting, to the base station and based on the selecting, a report message including a preferred transmit beam at the base station for each sub-band of the set of sub-bands, an order of preference for transmit beams at the base station for each sub-band of the set of sub-bands, a transmit beam at the base station for the carrier bandwidth, an order of preference for the set of sub-bands, or a combination thereof.

In some examples of the method, apparatuses, and non-transitory computer-readable medium described herein, the receiving may further include operations, features, means, or instructions for receiving the set of CSI-RSs across the carrier bandwidth using a set of receive beams, where a first CSI-RS of the set of CSI-RSs may be received in the first sub-band using the set of receive beams and a second CSI-RS of the set of CSI-RSs may be received in the second sub-band using the set of receive beams, and the determining may further include operations, features, means, or instructions for selecting a set of receive beams of the set of receive beams for the set of sub-bands, where the communicating with the base station in the carrier bandwidth may be further based on the selecting.

Some examples of the method, apparatuses, and non-transitory computer-readable medium described herein may further include operations, features, means, or instructions for transmitting, to the base station and based on the selecting, a report message including a preferred sub-band of the set of sub-bands, an order of preference for the set of sub-bands, or a combination thereof.

Some examples of the method, apparatuses, and non-transitory computer-readable medium described herein may further include operations, features, means, or instructions for determining a set of repetition cadences for receiving the set of signals across the carrier bandwidth, where the first signal and a repeated first signal may be received in the first sub-band according to a first repetition cadence of the set of repetition cadences and the second signal and a repeated second signal may be received in the second sub-band according to a second repetition cadence of the set of repetition cadences different from the first repetition cadence.

Some examples of the method, apparatuses, and non-transitory computer-readable medium described herein may further include operations, features, means, or instructions for monitoring for a set of SSB beams from one or more neighboring base stations, where the monitoring includes monitoring for a first set of SSB beams in the first sub-band and monitoring for a second set of SSB beams in the second sub-band, monitoring for the set of SSB beams in a specific sub-band of the carrier bandwidth, determining a monitoring configuration based on a trigger event, or a combination thereof.

Some examples of the method, apparatuses, and non-transitory computer-readable medium described herein may further include operations, features, means, or instructions for transmitting, to the base station, a report message including a set of transmission configuration indicator (TCI) states corresponding to the set of sub-bands, where the report message includes a first TCI state of the set of TCI states for the first sub-band and a second TCI state of the set of TCI states different from the first TCI state for the second sub-band.

In some examples of the method, apparatuses, and non-transitory computer-readable medium described herein, the first signal and the second signal may be received concurrently in the first sub-band and the second sub-band.

In some examples of the method, apparatuses, and non-transitory computer-readable medium described herein, the set of signal measurement values includes a set of reference signal receive power (RSRP) measurements, a set of reference signal receive quality (RSRQ) measurements, a set of signal-to-noise ratio (SNR) measurements, a set of signal-to-interference-plus-noise ratio (SINR) measurements, or a combination thereof.

In some examples of the method, apparatuses, and non-transitory computer-readable medium described herein, the communicating may include operations, features, means, or instructions for communicating one or more messages using an orthogonal frequency-division multiplexing (OFDM) waveform.

In some examples of the method, apparatuses, and non-transitory computer-readable medium described herein, the set of signal measurement values may be based on a center frequency for the carrier bandwidth, a transmit bandwidth for the carrier bandwidth, an antenna array configuration for the base station, a beam pattern, a location of the UE relative to the base station, or a combination thereof.

In some examples of the method, apparatuses, and non-transitory computer-readable medium described herein, the set of communication beams includes a set of UE receive beams, a set of base station transmit beams, a set of UE transmit beams, a set of base station receive beams, or a combination thereof.

A method for wireless communications at a base station is described. The method may include configuring a set of transmissions instances for a set of signals across a carrier bandwidth including a set of sub-bands, where at least one transmission instance of the set of transmissions instances is configured in each sub-band of the set of sub-bands, transmitting, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band, and communicating with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band.

An apparatus for wireless communications at a base station is described. The apparatus may include a processor, memory coupled with the processor, and instructions stored in the memory. The instructions may be executable by the processor to cause the apparatus to configure a set of transmissions instances for a set of signals across a carrier bandwidth including a set of sub-bands, where at least one transmission instance of the set of transmissions instances is configured in each sub-band of the set of sub-bands, transmit, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band, and communicate with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band.

Another apparatus for wireless communications at a base station is described. The apparatus may include means for configuring a set of transmissions instances for a set of signals across a carrier bandwidth including a set of sub-bands, where at least one transmission instance of the set of transmissions instances is configured in each sub-band of the set of sub-bands, transmitting, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band, and communicating with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band.

A non-transitory computer-readable medium storing code for wireless communications at a base station is described. The code may include instructions executable by a processor to configure a set of transmissions instances for a set of signals across a carrier bandwidth including a set of sub-bands, where at least one transmission instance of the set of transmissions instances is configured in each sub-band of the set of sub-bands, transmit, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band, and communicate with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band.

Some examples of the method, apparatuses, and non-transitory computer-readable medium described herein may further include operations, features, means, or instructions for transmitting, to the UE, a configuration message indicating for the UE to communicate using sub-band-specific communication beams, where the communicating in the carrier bandwidth using the set of communication beams may be based on the configuration message.

In some examples of the method, apparatuses, and non-transitory computer-readable medium described herein, the configuration message includes an RRC message, a MAC-CE, a DCI message, or a combination thereof.

Some examples of the method, apparatuses, and non-transitory computer-readable medium described herein may further include operations, features, means, or instructions for receiving, from the UE, a measurement report including respective information for each sub-band of the set of sub-bands based on the transmitted set of signals and determining the set of communication beams for the set of sub-bands based on the measurement report.

In some examples of the method, apparatuses, and non-transitory computer-readable medium described herein, the measurement report includes a preferred communication beam for each sub-band of the set of sub-bands, an order of preference for communication beams for each sub-band of the set of sub-bands, a preferred communication beam for one or more combinations of sub-bands of the set of sub-bands, an order of preference for communication beams for one or more combinations of sub-bands of the set of sub-bands, an order of preference for communication beams for the carrier bandwidth, an order of preference for the set of sub-bands, or a combination thereof.

Some examples of the method, apparatuses, and non-transitory computer-readable medium described herein may further include operations, features, means, or instructions for configuring the set of sub-bands for the carrier bandwidth, where configuring the set of transmissions instances may be based on the configured set of sub-bands for the carrier bandwidth, and transmitting, to the UE, a configuration message indicating the configured set of sub-bands for the carrier bandwidth.

Some examples of the method, apparatuses, and non-transitory computer-readable medium described herein may further include operations, features, means, or instructions for identifying the set of sub-bands based on the configured set of transmissions instances.

In some examples of the method, apparatuses, and non-transitory computer-readable medium described herein, the set of signals includes a set of SSBs, and the transmitting may further include operations, features, means, or instructions for transmitting multiple sets of SSB beams across the carrier bandwidth, where a first set of SSB beams of the multiple sets of SSB beams may be transmitted in the first sub-band and a second set of SSB beams of the multiple sets of SSB beams may be transmitted in the second sub-band.

Some examples of the method, apparatuses, and non-transitory computer-readable medium described herein may further include operations, features, means, or instructions for configuring a set of resource occasions for a set of physical channels for the UE, where one or more SSBs of the set of SSBs indicates the set of resource occasions for the set of physical channels.

Some examples of the method, apparatuses, and non-transitory computer-readable medium described herein may further include operations, features, means, or instructions for configuring multiple sets of resource occasions for a set of physical channels for the UE, where the first set of SSB beams indicates a first set of resource occasions of the multiple sets of resource occasions for the set of physical channels and the second set of SSB beams indicates a second set of resource occasions of the multiple sets of resource occasions different from the first set of resource occasions for the set of physical channels.

Some examples of the method, apparatuses, and non-transitory computer-readable medium described herein may further include operations, features, means, or instructions for determining a first group of SSB beams and a second group of SSB beams based on an antenna array configuration for the base station, where the first group of SSB beams includes the multiple sets of SSB beams, transmitting, to the UE, a system information message indicating the first group of SSB beams to receive across the carrier bandwidth, and transmitting the second group of SSB beams in a specific sub-band of the set of sub-bands for the carrier bandwidth.

In some examples of the method, apparatuses, and non-transitory computer-readable medium described herein, a first SSB sequence for the first set of SSB beams transmitted in the first sub-band may be the same as a second SSB sequence for the second set of SSB beams transmitted in the second sub-band.

In some examples of the method, apparatuses, and non-transitory computer-readable medium described herein, a first SSB sequence for the first set of SSB beams transmitted in the first sub-band may be different from a second SSB sequence for the second set of SSB beams transmitted in the second sub-band.

In some examples of the method, apparatuses, and non-transitory computer-readable medium described herein, the set of signals includes a set of CSI-RSs, the transmitting may further include operations, features, means, or instructions for transmitting multiple sets of CSI-RSs across the carrier bandwidth using a set of transmit beams, where a first set of CSI-RSs of the multiple sets of CSI-RSs may be transmitted in the first sub-band using the set of transmit beams and a second set of CSI-RSs of the multiple sets of CSI-RSs may be transmitted in the second sub-band using the set of transmit beams, and the method, apparatuses, and non-transitory computer-readable medium described herein may further include operations, features, means, or instructions for receiving, from the UE, a report message including a preferred transmit beam of the set of transmit beams for each sub-band of the set of sub-bands, an order of preference for the set of transmit beams for each sub-band of the set of sub-bands, a transmit beam of the set of transmit beams for the carrier bandwidth, an order of preference for the set of sub-bands, or a combination thereof.

In some examples of the method, apparatuses, and non-transitory computer-readable medium described herein, the set of signals includes a set of CSI-RSs, the transmitting may further include operations, features, means, or instructions for transmitting a set of CSI-RSs across the carrier bandwidth using a transmit beam, where a first CSI-RS of the set of CSI-RSs may be transmitted in the first sub-band using the transmit beam and a second CSI-RS of the set of CSI-RSs may be transmitted in the second sub-band using the transmit beam, and the method, apparatuses, and non-transitory computer-readable medium described herein may further include operations, features, means, or instructions for receiving, from the UE, a report message including a preferred sub-band of the set of sub-bands, an order of preference for the set of sub-bands, or a combination thereof.

Some examples of the method, apparatuses, and non-transitory computer-readable medium described herein may further include operations, features, means, or instructions for receiving, from the UE and based on the transmitted set of signals, a report message including a set of TCI states corresponding to the set of sub-bands, where the report message includes a first TCI state of the set of TCI states for the first sub-band and a second TCI state of the set of TCI states different from the first TCI state for the second sub-band.

In some examples of the method, apparatuses, and non-transitory computer-readable medium described herein, the first signal and the second signal may be transmitted concurrently in the first sub-band and the second sub-band.

In some examples of the method, apparatuses, and non-transitory computer-readable medium described herein, the communicating may include operations, features, means, or instructions for communicating one or more messages using an OFDM waveform.

In some examples of the method, apparatuses, and non-transitory computer-readable medium described herein, the set of communication beams includes a set of UE receive beams, a set of base station transmit beams, a set of UE transmit beams, a set of base station receive beams, or a combination thereof.

DETAILED DESCRIPTION

Figure 1:
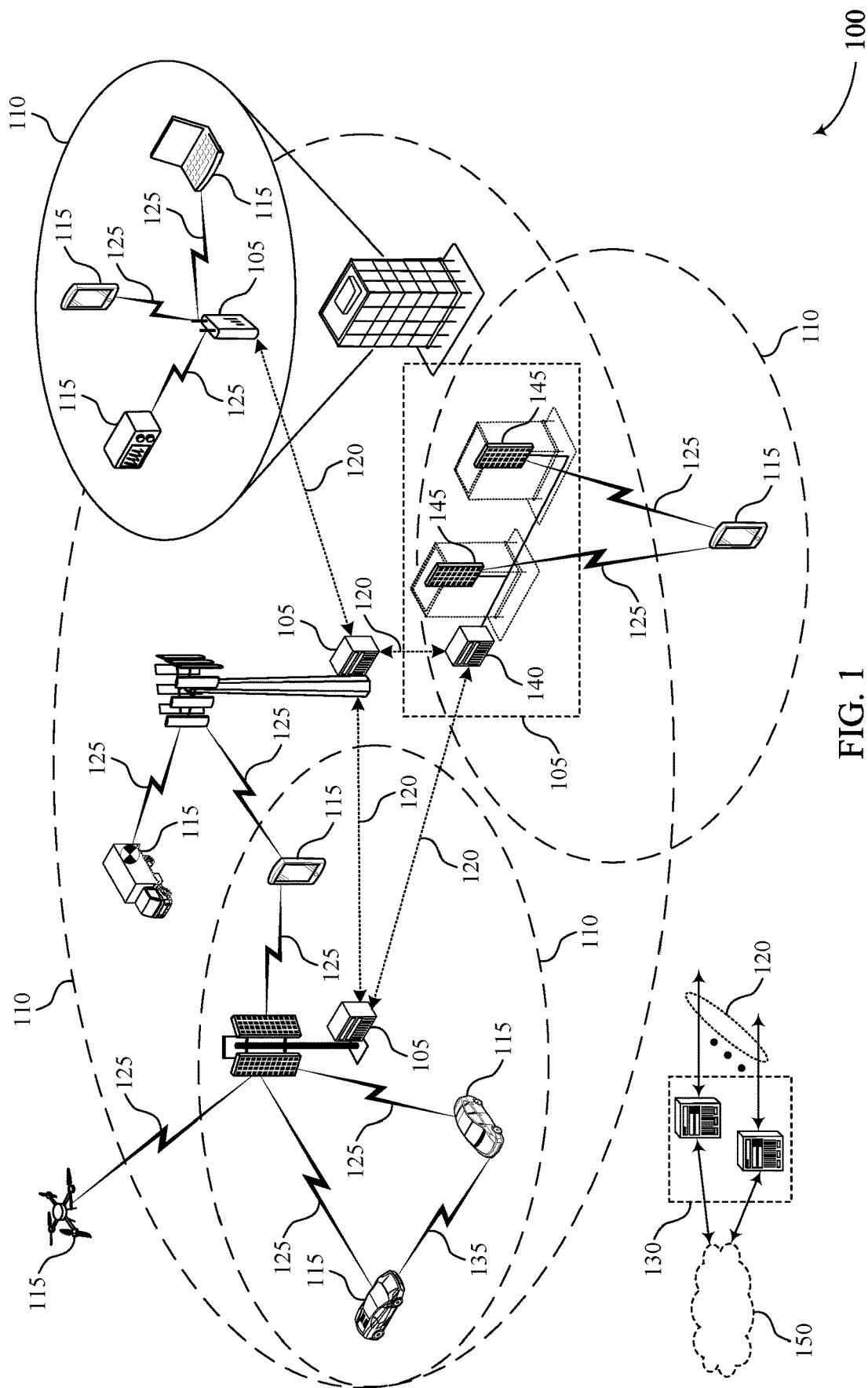
FIGS. 1 and 2 illustrate examples of wireless communications systems that support techniques for supporting wideband array operation in accordance with aspects of the present disclosure.

Some wireless communications systems may include communication devices, such as a UE and a base station (e.g., an eNodeB (eNB), a next-generation NodeB or a giga-NodeB, either of which may be referred to as a gNB, or some other base station), that may support multiple radio access technologies (RATs). Examples of RATs include 4G systems, such as LTE systems, and 5G systems, which may be referred to as NR systems. In some cases, the UE and the base station may support wideband array operations. That is, the UE and the base station may communicate over one or more carriers having relatively high carrier bandwidth-to-center frequency ratios (e.g., greater than five percent, ten percent, or some other threshold percentage). Additionally, the UE may, in some examples, perform channel estimation on one or more physical channels to maintain a reliable and efficient communication link between the UE and the base station.

In some cases, a millimeter wave (mmW) system operating using large carrier bandwidths may experience a change in an array response across the carrier bandwidth. For example, a base station or a UE, or both, may optimize wideband communications using a communication beam for a center frequency of the carrier bandwidth. However, signals transmitted at various frequencies across the carrier bandwidth (e.g., relatively far from the center frequency) may potentially experience significant degradation due to the large carrier bandwidth and the communication beams operating differently at different frequencies. As a result, channel estimation performance by the UE for a wideband carrier may be less reliable (e.g., as compared to communications over a narrower carrier bandwidth) and the wireless communications system may suffer performance degradation.

To support reliable transmissions for wideband array operations, the base station may configure multiple transmission instances for a set of signals (e.g., SSBs, CSI-RSs, or other beam-specific signals) across different sub-bands of the carrier bandwidth to support beam selection in different sub-bands of the carrier bandwidth. For example, the base station may configure a first signal in a first sub-band of the carrier bandwidth, a second signal in a second sub-band of the carrier bandwidth, and so on. The base station may transmit the set of signals in the multiple transmission instances to a UE. The UE may receive the set of signals and use the signals to determine characteristics of each sub-band of the carrier bandwidth. For example, the UE may measure a set of signal measurements (e.g., a reference signal receive power (RSRP), a reference signal receive quality (RSRQ), a signal-to-noise ratio (SNR), a signal-to-interference-plus noise ratio (SINR), or any other signal measurements) of each signal of the received set of signals. Each signal measurement may correspond to a sub-band of the carrier bandwidth that the UE may use to determine a communication beam for the respective sub-band. Based on the sets of signal measurements, the UE may determine a communication beam to use for each sub-band. For example, the UE may determine a first communication beam for the first sub-band based on a set of signal measurements associated with first signals received in the first sub-band and a second communication beam for the second sub-band based on a set of signal measurements associated with second signals received in the second sub-band.

In some examples, the UE may determine the communication beam to use for each sub-band by comparing signal measurements of different signals. For example, the UE may compare a first signal measurement of a first signal received in a first sub-band to a second signal measurement of a second signal received in a second sub-band and calculate a difference value between the first signal measurement and the second signal measurement. If the difference value is greater than or equal to a threshold (i.e., the beam performance varies significantly from the first sub-band to the second sub-band), the UE may select different communication beams for communication in the first sub-band and the second sub-band. For example, the UE may select a first communication beam for communication in the first sub-band and a second communication beam for communication in the second sub-band. Alternatively, if the difference value is less than the threshold, the UE may save power by using a same communication beam for the carrier bandwidth (e.g., including the first sub-band and the second sub-band).

The UE may transmit a report to the base station that includes information for each respective sub-band of the carrier bandwidth. For example, the UE may transmit a report indicating a preferred communication beam for each sub-band of the carrier bandwidth. The base station may receive the report and may determine the communication beam to use for each sub-band. Based on the determined communication beams (e.g., sub-band-specific communication beam pairs between the UE and the base station), the UE and the base station may communicate in the carrier bandwidth.

Aspects of the subject matter described in this disclosure may be implemented to realize one or more of the following potential improvements, among others. The techniques employed by the UE may provide benefits and enhancements to the operation of the UE. For example, operations performed by the UE may provide improvements to channel estimation operations. In some examples, communicating with a base station using multiple communication beams in different sub-bands across the carrier bandwidth may allow the UE to more accurately estimate channel characteristics of each sub-band of the carrier bandwidth. In some other examples, communicating with a base station using multiple communication beams in different sub-bands across the carrier bandwidth may provide improvements to power consumption, spectral efficiency, and, in some examples, may promote highly reliable communications, among other benefits.

Aspects of the disclosure are initially described in the context of wireless communications systems. Aspects of the disclosure are then described in the context of carrier schemes and process flows. Aspects of the disclosure are further illustrated by and described with reference to diagrams and flowcharts that relate to optimizations for wideband array operation, for example, in mmW systems.

FIG. 1 illustrates an example of a wireless communications system 100 that supports techniques for supporting wideband array operation in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support wideband array operations. That is, the wireless communications system 100 may support wideband communications between a base station 105 and a UE 115 using a high transmission bandwidth-to-center frequency ratio. In some cases, if the transmission bandwidth-to-center frequency ratio is greater than a threshold percentage (e.g., five percent, ten percent, or some other threshold percentage), the wireless communications system 100 may be considered a wideband system. In some such systems, the base station 105 and the UE 115 may communicate over one or more carriers with relatively large carrier bandwidths. In some cases, an array response of the base station 105, the UE 115, or both may change across the carrier bandwidth. For example, signals transmitted at various frequencies across the carrier bandwidth (e.g., relatively far from the center frequency) may suffer moderate to severe signal loss (e.g., SINR) loss) or may be undetectable by the UE 115 due to the change in the array response across the bandwidth. The signal loss may potentially cause a decrease in transmission reliability and a loss in performance.

Various aspects of the described techniques support wideband array operations via sub-band-specific signaling. For example, the base station 105 may configure multiple signals in different sub-bands across the carrier bandwidth to support separate beam selection in the different sub-bands. For example, the base station 105 may transmit a first signal (e.g., a SSB, a CSI-RS, or another beam-specific signal) in a first sub-band of the carrier bandwidth and a second signal in a second sub-band of the carrier bandwidth. The UE 115 may measure one or more signal measurements (e.g., a RSRP, a RSRQ, an SNR, an SINR, or any combination thereof) of the first signal and the second signal to estimate channel characteristics of the first sub-band and the second sub-band, respectively.

The UE 115 may perform beamforming based on the signal measurements across the bandwidth. In some examples, the UE 115 may determine a first communication beam for the first sub-band and a second communication beam for the second sub-band based on the signal measurements of the first signal and the second signal. For example, the UE 115 may compare a first signal measurement of the first signal to a second signal measurement of the second signal. The UE 115 may calculate a difference value between the first signal measurement and the second signal measurement and may select the first communication beam for the first sub-band and the second communication beam for the second sub-band if the difference value satisfies a threshold. The difference value satisfying the threshold may indicate that the performance of a communication beam (e.g., the first communication beam) used to measure the first signal measurement and the second signal measurement varies significantly from the first sub-band to the second sub-band. Alternatively, the UE 115 may select the first communication beam for the carrier bandwidth (e.g., including the first sub-band and the second sub-band) if the difference value fails to satisfy the threshold. The UE 115 may communicate with the base station 105 using the selected one or more communication beams.

Figure 2:
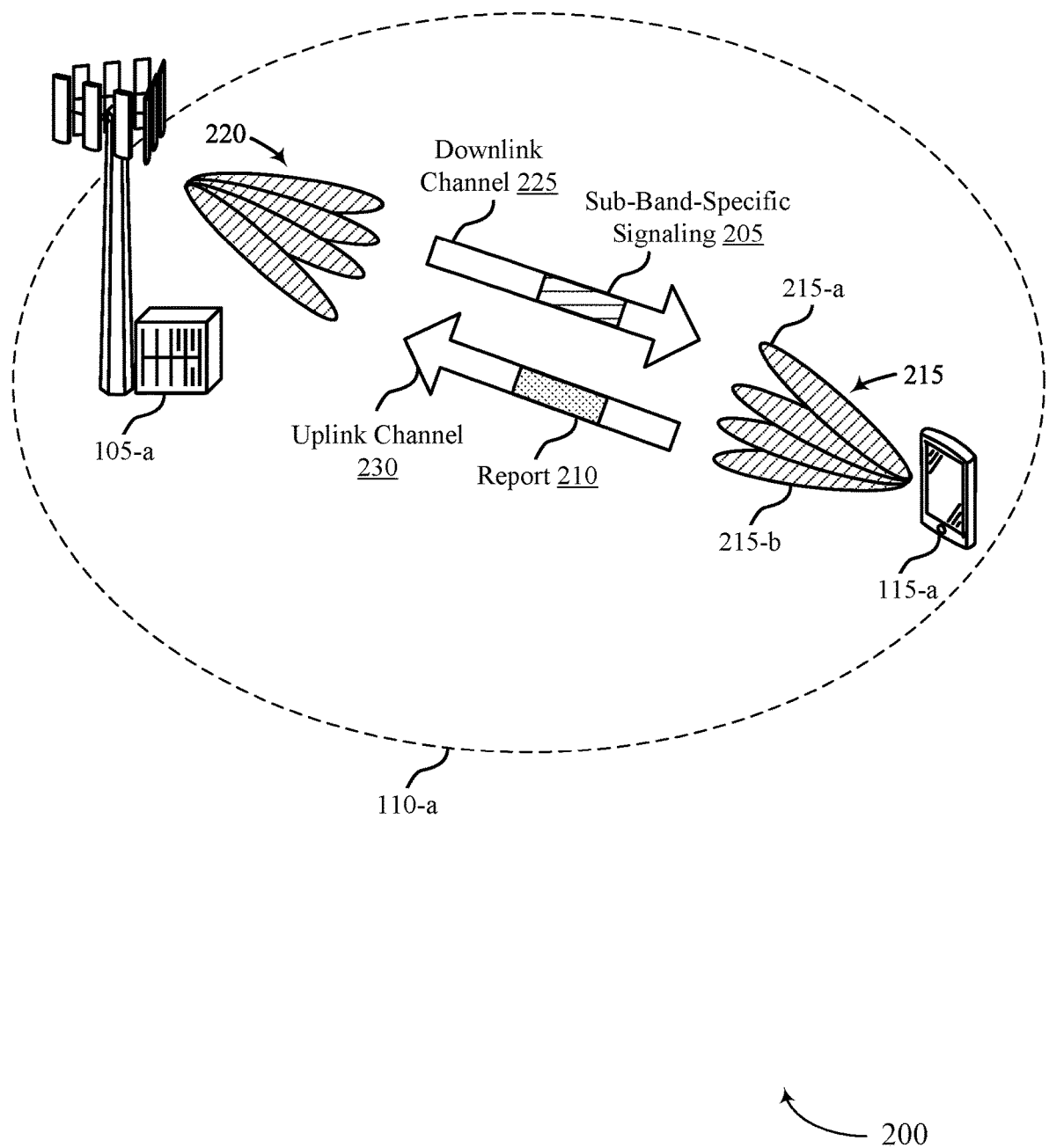

FIG. 2 illustrates an example of a wireless communications system 200 that supports techniques for supporting wideband array operation in accordance with aspects of the present disclosure. In some examples, the wireless communications system 200 may implement aspects of the wireless communications system 100. For example, the wireless communications system 200 may include a base station 105-a and a UE 115-a within a geographic coverage area 110-a. The base station 105-a and the UE 115-a may be examples of a base station 105 and a UE 115 as described with reference to FIG. 1. In some examples, the wireless communications system 200 may support one or more radio access technologies including 4G systems such as LTE systems, LTE-A systems, or LTE-A Pro systems, 5G systems which may be referred to as NR systems, or a combination of these or other radio access technologies. In some cases, the base station 105-a may implement sub-band-specific signaling 205 and the UE 115-a may implement sub-band-specific communication beam selection based on the sub-band-specific signaling 205 to support reliable wideband array operation.

The base station 105-a and the UE 115-a may be configured with multiple antenna ports, which may be used to employ techniques such as transmit diversity, receive diversity, MIMO communications, beamforming, or a combination thereof. The antenna ports, physical antennas, or both of the base station 105-a and the UE 115-a may be located within one or more respective antenna arrays or antenna panels, which may support MIMO operations, transmit beamforming, receive beamforming, or a combination thereof. For example, the base station 105-a antennas or antenna arrays may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-a may use to support beamforming of communications with the UE 115-a. Likewise, the UE 115-a may have one or more antenna arrays that may support various MIMO operations, beamforming operations, or both. Additionally or alternatively, an antenna panel may support radio frequency beamforming for a signal transmitted via one or more antenna ports.

The base station 105-a and the UE 115-a may be configured to support directional communications (for example, beamformed communications) using the multiple antenna ports. The base station 105-a and the UE 115-a may communicate via the directional communications using multiple component carriers. For example, the base station 105-a and the UE 115-a may be configured to support multiple downlink component carriers, multiple uplink component carriers, or both. The base station 105-a and the UE 115-a may be configured to support the directional communications over a carrier bandwidth or may be configured to support the directional communications over one of multiple carrier bandwidths.

The UE 115-a may support directional communications using a set of UE communication beams 215, and the base station 105-a may support directional communications using a set of base station communication beams 220. That is, the UE 115-a may transmit uplink transmissions to the base station 105-a via an uplink channel 230 using one or more UE communication beams 215 (e.g., UE transmit beams) of the set of UE communication beams 215 and may receive downlink transmissions from the base station 105-a via a downlink channel 225 using one or more UE communication beams 215 (e.g., UE receive beams) of the set of UE communication beams 215. Additionally, the base station 105-a may receive uplink transmissions from the UE 115-a via the uplink channel 230 using one or more base station communication beams 220 (e.g., base station receive beams) of the set of base station communication beams 220 and may transmit downlink transmissions via the downlink channel 225 using one or more base station communication beams 220 (e.g., base station transmit beams) of the set of base station communication beams 220.

The base station 105-a may transmit system information to the UE 115-a to establish or modify a connection between the base station 105-a and the UE 115-a. In some examples, the base station 105-a may broadcast the system information to a set of UEs 115 including the UE 115-a, and the UEs 115 may monitor for and blindly decode the system information. For example, the base station 105-a may transmit one or more SSBs to the UE 115-a, and the UE 115-a may synchronize in one or both of a time domain and a frequency domain with the base station 105-a and obtain various base station information based on the one or more SSBs. Additionally, the UE 115-a may perform downlink channel measurements based on receiving the one or more SSBs. SSBs may be examples of sub-band-specific signaling 205.

The base station 105-a and the UE 115-a may transmit reference signals to increase an efficiency and a reliability of communications between the base station 105-a and the UE 115-a. The reference signals may be transmitted from the base station 105-a to the UE 115-a, and vice versa. The reference signals transmitted to the UE 115-a may be referred to as downlink reference signals and reference signals transmitted to the base station 105-a may be referred to as uplink reference signals. In some examples, the reference signals may be used by the wireless devices to determine characteristics of a physical channel (for example, a PDSCH, a PUSCH). The characteristics of a physical channel may also be referred to as a channel estimate, a channel condition, or a channel metric. The UE 115-a and the base station 105-a may use the reference signals to decode or demodulate data transmitted via the physical channel. For example, the base station 105-a may transmit CSI-RSs to the UE 115-a such that the UE 115-a may estimate a state of the channel. CSI-RSs may be examples of sub-band-specific signaling 205.

The wireless communications system 200 may support wideband communications between the base station 105-a and the UE 115-a. For example, the base station 105-a and the UE 115-a may communicate over one or more carriers having a high carrier bandwidth-to-center frequency ratio. In some cases, an array response of an antenna array of the base station 105-a, the UE 115-a, or both may change across a carrier bandwidth of a carrier of the one or more carriers. The change in array response may potentially cause signal loss and a decrease in transmission reliability. In some examples, signal loss due to a change of the array response may be referred to as beam squint. In some cases, a severity of the beam squint may depend on the center frequency of the carrier, a size of the carrier bandwidth, an array configuration of the antenna array of the base station 105-a, the UE 115-a, or both, a beam pattern (e.g., a beam width, a beam direction, or another communication beam parameter) of the base station 105-a, the UE 115-a, or both, a location of the UE 115-a with respect to the antenna array of the base station 105-a, or any combination thereof.

To decrease or mitigate beam squint, the base station 105-a may transmit signals (e.g., SSBs, CSI-RSs, or other beam-specific signals) distributed across the bandwidth of the carrier, and the UE 115-a may use the signals to measure characteristics of a physical channel across the bandwidth. The signals may be examples of signals using OFDM-based waveforms transmitted on a single carrier. For example, the base station 105-a may configure multiple sub-bands across the carrier bandwidth. The base station 105-a may transmit sub-band-specific signaling 205 to the UE 115-a via the downlink channel 225 that includes a set of signals, where each signal of the set of signals corresponds to a sub-band of the multiple sub-bands. For example, the sub-band-specific signaling 205 may include a first signal transmitted in a first sub-band of the multiple sub-bands and a second signal transmitted in a second sub-band of the multiple sub-bands. In some cases, each signal of the set of signals may include the same signal information (e.g., a set of SSBs may include a same SSB sequence). In some other cases, some signals of the set of signals may include different signal information (e.g., different sequences) to allow the UE 115-a to distinguish between signals. For example, using the different signal information, the UE 115-a may identify a type of signal associated with each signal (e.g., the UE 115-a may determine whether an SSB is a primary SSB or a secondary SSB).

The UE 115-a may receive the sub-band-specific signaling 205 and may measure one or more signal measurements of each signal of the received set of signals. For example, the UE 115-a may measure an RSRP, an RSRQ, an SNR, an SINR, or any combination of these or other signal measurements for each signal of the received set of signals. The UE 115-a may measure one or more signal measurements of each signal of the received set of signals for a particular UE communication beam 215. For example, the UE 115-a may measure one or more signal measurements of the first signal and the second signal using a first UE communication beam 215-a (e.g., a UE receive beam). From the one or more signal measurements of the first signal and the one or more signal measurements of the second signal, the UE 115-a may determine a level of beam squint between the first sub-band and the second sub-band using the first UE communication beam 215-a. That is, the UE 115-a may compare a first signal measurement (e.g., RSRP, RSRQ, SNR, SINR, or another signal measurement) of the one or more signal measurements of the first signal to a second signal measurement of the one or more signal measurements of the second signal and may calculate a difference value between the first signal measurement and the second signal measurement. The level of beam squint between the first sub-band and the sub-band may be based on the difference value between the first signal measurement and the second signal measurement. Additionally, the UE 115-a may determine a level of beam squint between any two sub-bands of the multiple sub-bands by calculating a difference value between signal measurements of the two sub-bands. In some cases, the beam squint may be based on a communication beam pair between the UE 115-a and the base station 105-a. For example, the UE 115-a may calculate a difference between signals received in different sub-bands from a same base station communication beam 220 (e.g., base station transmit beam) using a same UE communication beam 215 (e.g., UE receive beam) to determine a level of beam squint for a specific beam pair.

The UE 115-a may be configured with one or more threshold beam squint values. For example, the UE 115-a may be pre-configured with a threshold beam squint value or the base station 105-*a* may configure the UE 115-*a* with a threshold beam squint value. In some examples, the base station 105-*a* may transmit the threshold beam squint value (e.g., three decibels (dB) or some other threshold value) in remaining minimum system information (RMSI) or via a physical broadcast channel (PBCH). The UE 115-*a* may select to communicate in a sub-band of the carrier using a particular UE communication beam 215 based on the threshold beam squint value. For example, the UE 115-*a* may determine the beam squint between the first sub-band and the second sub-band. If the beam squint is greater than the threshold beam squint value, the UE 115-*a* may select the first UE communication beam 215-*a* to communicate in the first sub-band and the second UE communication beam 215-*b* to communicate in the second sub-band. That is, if the difference in signal measurements between a pair of sub-bands in the carrier bandwidth satisfies the threshold beam squint value, the UE 115-*a* may perform beamforming (e.g., communication beam selection) per sub-band. Additionally or alternatively, if the beam squint is less than the threshold beam squint value, the UE 115-*a* may select the first UE communication beam 215-*a* to communicate in the first sub-band and the second sub-band in order to save power. That is, if the difference in signal measurements between each pair of sub-bands in the carrier bandwidth fails to satisfy the threshold beam squint value, the UE 115-*a* may perform beamforming for the full carrier bandwidth (e.g., rather than on a sub-band-by-sub-band basis) to reduce the processing involved in beamforming.

The UE 115-*a* may perform beam management based on the level of beam squint across the carrier bandwidth. For example, the UE 115-*a* may be pre-configured with multiple threshold beam squint values or the base station 105-*a* may configure the UE 115-*a* with multiple threshold beam squint values, where each threshold beam squint value corresponds to a different level of beam squint. For example, a first threshold beam squint value may correspond to a severe level beam squint (e.g., a communication beam is undetectable in one or more sub-bands of the carrier bandwidth, a communication beam is misaligned, or some other signal loss that causes the UE 115-*a* to detect a communication beam of a sub-band), a second threshold beam squint value may correspond to a moderate level of beam squint (e.g., 1-2 dB SINR loss across the carrier bandwidth, or some other loss in signal measurement), and a third threshold beam squint value may correspond to a small level of beam squint (e.g., negligible or less than 1 dB SINR loss across the carrier bandwidth).

The UE 115-*a* may perform one or more beam management procedures based on the level of beam squint. In some cases, the sub-band-specific signaling 205 may include SSBs and CSI-RSs that the UE 115-*a* may use to perform the one or more beam management procedures. In some examples, the base station communication beams 220 may be relatively narrower than the UE communication beams 215, and the base station 105-*a* may use relatively more beams than the UE 115-*a* (e.g., based on the antenna port configurations of the base station 105-*a* and the UE 115-*a*). In some examples, if the beam squint between the first sub-band and the second sub-band satisfies the first threshold beam squint value (e.g., the beam squint corresponds to a severe level of beam squint), the UE 115-*a* may perform a first set of beam management procedures. In some cases, the first set of beam management procedures may include a first beam management procedure, a second beam management procedure, and a third beam management procedure. In the first beam management procedure, the UE 115-*a* may select a first preferred base station communication beam 220 of a set of base station communication beams 220 used to transmit the sub-band-specific signaling 205 (e.g., SSBs), a first preferred UE communication beam 215 of a set of UE communication beams 215 used to receive the sub-band-specific signaling 205, or both based on measuring the received SSBs. The UE 115-*a* may transmit a report 210 of the preferred base station communication beam(s) 220 (e.g., sub-band-specific preferred beams) to the base station 105-*a*. In the second beam management procedure, the UE 115-*a* may select a second preferred base station communication beam 220 of a subset of base station communication beams of the set of base station communication beams 220 based on measuring the received CSI-RSs, where the subset of base station communication beams may be based on the first preferred base station communication beam 220. The UE 115-*a* may transmit a report 210 of the second preferred base station communication beam 220 to the base station 105-*a*. In the third beam management procedure, the UE 115-*a* may perform UE communication beam 215 refinement (e.g., communication beam selection) per sub-band based on received CSI-RSs.

In some examples, if the beam squint between the first sub-band and the second sub-band fails to satisfy the first threshold beam squint value but does satisfy the second threshold beam squint value, the UE 115-*a* may perform a second set of beam management procedures. In some cases, the second set of beam management procedures includes the second beam management procedure and the third beam management procedure from the first set of beam management procedures. In some other examples, if the beam squint between the first sub-band and the second sub-band fails to satisfy the second threshold beam squint value, but does satisfy the third beam squint value, the UE 115-*a* may perform a third set of beam management procedures. In some cases, the third set of beam management procedures includes the third beam management procedure from the first set of beam management procedures. Thus, if the difference in signal measurements between a pair of sub-bands in the carrier bandwidth satisfies one or more of the multiple threshold beam squint values, the UE 115-*a* may perform the first set of beam management procedures, the second set of beam management procedures, or the third set of beam management procedures per sub-band. However, any other combination of beam management procedures, levels of beam squint, and beam squint thresholds may be supported by the wireless communications system 200.

In some examples, the UE 115-*a* may measure one or more signal measurements for the received set of signals using multiple UE communication beams 215. For example, the UE 115-*a* may measure one or more signal measurements (e.g., RSRP, RSRQ, SNR, SINR, or another signal measurement) of the first signal and the second signal using the first UE communication beam 215-*a* and may measure one or more signal measurements of the first signal and the second signal (e.g., the same first signal and second signal or a repetition of the first signal and second signal) using a second UE communication beam 215-*b*. The UE 115-*a* may compare a first signal measurement of the first signal using the first UE communication beam 215-*a* and a second signal measurement of the first signal using the second UE communication beam 215-*b*. The UE 115-*a* may also compare a first signal measurement of the second signal using the first UE communication beam 215-*a* and a second signal measurement of the second signal using the second UE communication beam 215-*b*. The UE 115-*a* may select a UE communication beam 215 to communicate in the first sub-band and the second sub-band based on the comparisons. For example, if the first signal measurement of the first signal is greater than the second signal measurement of the first signal, the UE 115-*a* may select the first UE communication beam 215-*a* to communicate in the first sub-band. Additionally, if the first signal measurement of the second signal is less than the second signal measurement of the second signal, the UE 115-*a* may select the second UE communication beam 215-*b* to communicate in the second sub-band. Thus, the UE 115-*a* may communicate in each sub-band of the carrier using beam selection on a per sub-band basis. In some examples, the UE 115-*a* may determine multiple UE communication beams 215 in addition to the first UE communication beam 215-*a* and the second UE communication beam 215-*b* to communicate in the multiple sub-bands of the carrier.

In some examples, the base station 105-*a* may transmit a configuration message indicating that the UE 115-*a* communicate using one or more UE communication beams 215. For example, the configuration message may configure the UE 115-*a* to perform beam selection at the sub-band-level (e.g., as opposed to the carrier-level). In some cases, the UE 115-*a* may receive the configuration message in an RRC message, a MAC-control element (MAC-CE), a downlink control information (DCI) message, or a combination thereof. The UE 115-*a* may select a UE communication beam 215 to communicate in each sub-band based on the configuration message.

Additionally or alternatively, the base station 105-*a* may transmit a configuration message indicating the multiple sub-bands across the carrier bandwidth. In some examples, the configuration message may indicate a reference sub-band of the multiple sub-bands. The UE 115-*a* may measure one or more signal measurements of signals of the set of signals transmitted in the reference sub-band. In some cases, the UE 115-*a* may determine a UE communication beam 215 for communicating in the carrier bandwidth based on the signal measurements for the signals transmitted in the reference sub-band. Additionally or alternatively, the UE 115-*a* may determine whether to communicate with the base station 105-*a* using different UE communication beams 215 across the carrier bandwidth based on the one or more signal measurements of the signals transmitted in the reference sub-band.

The UE 115-*a* may transmit a report 210 to the base station 105-*a* via the uplink channel 230 to report sub-band-specific beam information. The UE 115-*a* may transmit the report 210 using one of the determined UE communication beams 215 and the base station 105-*a* may receive the report 210 using one of the base station communication beams 220. In some examples, the report 210 may include respective information for each sub-band of the multiple sub-bands of the carrier. For example, the report 210 may include a preferred UE communication beam 215 for each sub-band, an order of preference for the UE communication beams 215 for each sub-band, a preferred UE communication beam 215 for one or more combinations of sub-bands, an order of preference for communication beams for one or more combinations of sub-bands, an order of preference for communication beams for the carrier bandwidth, an order of preference for the multiple sub-bands, or a combination thereof. In some examples, the order of preference may be based on the signal measurements for the communication beams (e.g., with a relatively higher RSRP or other measurement corresponding to a relatively higher order of preference and a relatively lower RSRP or other measurement corresponding to a relatively lower order of preference). In some cases, the report 210 may include a set of transmission configuration indicator (TCI) states, where each TCI state corresponds to a sub-band of the multiple sub-bands. For example, the report 210 may include a first TCI state corresponding to the first sub-band and a second TCI state corresponding to the second sub-band. In some cases, the first TCI state and the second TCI states are different TCI states.

The base station 105-*a* may receive the report 210 and determine a set of base station communication beam 220 to use to communicate on the carrier based on the report 210. For example, the base station 105-*a* may select a base station communication beam 220 for the full carrier bandwidth or may select a base station communication beam 220 for each sub-band of the multiple sub-bands of the carrier.

In some examples, the sub-band-specific signaling 205 may include repetitions of the set of signals for a time period. That is, the base station 105-*a* may transmit repetitions of the set of signals across the carrier bandwidth for the time period. In some cases, the set of signals are repeated according to a repetition cadence. In some examples, signals in a first sub-band (e.g., a reference sub-band) may be repeated according to a repetition cadence different than a repetition cadence of signals in a second sub-band. In some other examples, signals of each sub-band may be repeated according to a same repetition cadence.

The UE 115-*a* may calculate a difference value between a first signal measurement of the first signal in the first sub-band and a second signal measurement of the second signal in the second sub-band for the first set of signals at a repetition in time. The UE 115-*a* may determine that the difference value between the first signal measurement and the second signal measurement changes less than a threshold amount during a time period (e.g., from a first repetition in time to a second repetition in time for the time period). Based on the difference value changing less than the threshold amount, the UE 115-*a* may receive a repetition of the first signal in the first sub-band in a subsequent slot and may refrain from receiving a repetition of the second signal in the second sub-band in the subsequent slot. The UE 115-*a* may measure a first signal measurement for the repeated first signal in the subsequent slot and, based on determining that the difference value changed less than the threshold amount, may derive the second signal measurement for a repeated second signal in the second sub-band in the subsequent slot from the difference value calculated during the time period (e.g., a single difference value or an average difference value). In some examples, the UE 115-*a* may implement an extrapolation function to derive one or more measurements on unmonitored sub-bands (e.g., based on previous measurements on these sub-bands). The difference value changing less than the threshold amount during the time period may indicate or imply that the UE 115-*a* and the base station 105-*a* are relatively stationary devices, such as customer-premises equipment (CPE).

The UE 115-*a* may select a subset of the UE communication beams 215 for communicating on a set of physical channels (e.g., a physical downlink control channel (PDCCH), a physical uplink control channel (PUCCH), a PDSCH, a PUSCH, a physical random access channel (PRACH), a PBCH, or some combination thereof). For example, the base station 105-*a* may configure a physical channel of the set of physical channels in a set of frequency resources corresponding to one or more specific sub-bands. The UE 115-*a* may select a specific UE communication beam 215 for communicating on a physical channel based on a corresponding sub-band including resources for the physical channel. For example, the UE 115-*a* may select the first UE communication beam 215-*a* for communicating on a first sub-band configured for a first physical channel of the set of physical channels and the second UE communication beam 215-*b* for communicating on a second sub-band configured for a second physical channel of the set of physical channels.

The base station 105-*a* may configure the set of resource occasions (e.g., frequency resources) associated with the set of physical channels. In some examples, the base station 105-*a* may transmit the set of resource occasions to the UE 115-*a* in RMSI, other system information (OSI), or a combination thereof. In some cases, the UE 115-*a* may identify a resource occasion of the set of resource occasions configured for a physical channel of the set of physical channels based on decoding the RMSI, OSI, or combination thereof. In some cases, the UE 115-*a* may select a UE communication beam 215 for communicating on a physical channel of the set of physical channels based on the resource occasion associated with the physical channel. In some examples, the base station 105-*a* may configure a set of resource occasions associated with a set of physical channels for each sub-band of the carrier. In some cases, the UE 115-*a* may identify the set of resource occasions configured for the set of physical channels for a sub-band based on decoding the RMSI, OSI, or combination thereof of the sub-band. In some examples, the UE 115-*a* may select a UE communication beam 215 for communicating on the set of physical channels for the sub-band based on the sub-band in which the set of physical channels is located. In this way, the UE 115-*a* may complete a configuration setup procedure associated the set of physical channels configured for each sub-band. In some other examples, the base station 105-*a* may configure a set of resource occasions associated with a same set of physical channels across the carrier in each sub-band of the carrier. For example, the UE 115-*a* may identify the set of resource occasions associated with the same set of physical channels by decoding the RMSI, OSI, or combination thereof in any of the sub-bands of the carrier. That is, the RMSI, OSI, or combination thereof of each of the sub-bands may indicate the same set of resource occasions for the physical channels. In some cases, the UE 115-*a* may select a UE communication beam 215 to communicate on a physical channel of the same set of physical channels based on the sub-band in which a resource occasion for the physical channel is allocated. In this way, the UE 115-*a* may complete a configuration setup procedure associated with the same set of physical channels.

The base station 105-*a* may group the signals of the set of signals transmitted in sub-band-specific signaling 205. For example, the base station 105-*a* may divide the signals into a first group and a second group. The base station 105-*a* may divide the signals into the first group and the second group based on an array configuration of the base station 105-*a*, one or more base station communication beams 220, a location of the UE 115-*a* with respect to the array configuration of the base station 105-*a*, or a combination thereof. For example, the base station 105-*a* may determine that a first subset of signals (e.g., SSBs) may be transmitted using one or more base station communication beams 220 in a broadside direction with respect to the antenna array of the base station 105-*a*. Base station communication beams 220 transmitted in the broadside direction may be associated with stronger signals received by the UE 115-*a*. The base station 105-*a* may group the signals associated with the broadside beams and may determine to transmit these signals of the first group in a subset of the sub-bands (e.g., rather than transmitting in each sub-band of the carrier bandwidth). Additionally or alternatively, the base station 105-*a* may determine that a second subset of signals (e.g., SSBs) may be transmitted in one or more base station communication beams 220 in an endfire direction with respect to the antenna array of the base station 105-*a* or in a direction that approaches the edge of the field of view of the antenna array, or both. Base station communication beams 220 transmitted in the endfire direction or the direction approaching the edge of the field of view of the antenna array may be associated with weaker signals received by the UE 115-*a*. Based on determining the second subset of signals, the base station may group these signals into the second group and may determine to transmit these signals in all of the sub-bands of the carrier bandwidth. That is, the base station 105-*a* may transmit these relatively weaker signals—which may be more susceptible to degradation across frequency than signals transmitted using broadside beams—in multiple sub-bands across the carrier bandwidth such that the UE 115-*a* may measure signal degradation across the carrier bandwidth.

The base station 105-*a* may configure the UE 115-*a* to monitor for sub-band-specific signaling from one or more neighboring base stations 105. For example, the UE 115-*a* may be configured to monitor for a set of SSB beams transmitted from one or more neighboring base stations 105. In some cases, the UE 115-*a* may monitor for a first set of SSB beams in a first sub-band and a second set of SSB beams in a second sub-band. In some examples, the UE 115-*a* may monitor for the set of SSB beams in a specific sub-band (e.g., a reference sub-band) of the multiple sub-bands of the carrier configured by the base station 105-*a*. The UE 115-*a* may periodically or aperiodically monitor other sub-bands of the carrier for SSB beams from the neighboring base stations 105. In some cases, the base station 105-*a* may trigger the UE 115-*a* to monitor for the set of SSB beams across the set of sub-carriers from the one or more neighboring base stations 105. For example, a handover procedure or a beam change procedure may trigger the UE 115-*a* to monitor for the set of SSB beams across the sub-carriers (e.g., as opposed to monitoring in a specific reference sub-carrier). In some cases, the UE 115-*a* may determine whether to measure signals received from neighboring base stations 105 in one sub-carrier or across multiple sub-carriers (e.g., without configuration from the base station 105-*a*). The UE 115-*a* may transmit a report 210 to the base station 105-*a* indicating signal measurements for neighboring base stations 105 on a carrier-level (e.g., based on a reference sub-band) or on a sub-band-level (e.g., based on multiple sub-bands).

In some examples, the set of signals included in the sub-band-specific signaling 205 may be sets of SSB beams (e.g., supporting an access procedure at the UE 115-*a*). The UE 115-*a* may receive a number of sets of SSB beams across the carrier bandwidth using a set of UE communication beams 215. Each set of SSB beams may include a number of SSBs transmitted using a set of base station communication beams 220 (e.g., base station transmit beams). For example, the UE 115-*a* may receive a first set of SSB beams of the number of sets of SSB beams in the first sub-band and a second set of SSB beams of the number of sets of SSB beams in the second sub-band using a set of UE communication beams 215. The UE 115-*a* may measure one or more signal measurements (e.g., RSRP, RSRQ, SNR, SINR, or any other signal measurements) for the first set of SSB beams received in the first sub-band and the second set of SSB beams received in the second sub-band for a number of UE communication beams 215 of the set of UE communication beams 215. In some cases, the UE 115-a may select a UE communication beam 215 of the number of UE communication beams 215 to receive an SSB of the number of sets of SSB beams in each sub-band based on measuring the one or more signal measurements. The UE 115-a may communicate with the base station 105-a using the selected UE communication beams 215. In some cases, the base station 105-a may communicate with the UE 115-a using one or more base station communication beams 220 corresponding to specific SSB beams. For example, for a specific sub-band, the UE 115-a may determine a set of signal measurements for a set of SSB beams (e.g., corresponding to base station transmit beams) using a set of UE receive beams. The UE 115-a may identify a strongest signal measurement and the UE 115-a and the base station 105-a may communicate in the specific sub-band using the base station transmit beam and UE receive beam corresponding to that strongest signal measurement. In some examples, the UE 115-a may use a different UE receive beam in a different sub-band, the base station 105-a may use a different base station transmit beam in a different sub-band, or both.

In some examples, each set of SSB beams may be associated with an SSB sequence. In some cases, each set of SSB beams of the number of sets of SSB beams may be associated with a same SSB sequence. In some other cases, different sets of SSB beams of the number of sets of SSB beams may be associated with different SSB sequences. For example, the SSB sequences may be based on the frequency resources, the sub-band, or both in which the SSB beams are transmitted.

In some examples, the set of signals included in the sub-band-specific signaling 205 may be sets of CSI-RSs (e.g., when the UE 115-a is connected to the network via the base station 105-a). The UE 115-a may receive a number of sets of CSI-RSs distributed across the carrier bandwidth using a set of UE communication beams 215. For example, the UE 115-a may receive a first set of CSI-RSs of the number of sets of CSI-RSs in a first sub-band and a second set of CSI-RSs of the number of sets of CSI-RSs in a second sub-band using the set of UE communication beams 215. In some cases, the base station 105-a may transmit each set of CSI-RSs using a set of base station communication beams 220. The UE 115-a may measure one or more signal measurements for each set of received CSI-RSs and may determine one or more preferred base station communication beams 220 for each of the sub-bands of the carrier. The UE 115-a may transmit a report 210 to the base station 105-a that includes a preferred base station communication beam 220 at the base station 105-a for each sub-band, an order of preference for base station communication beams 220 at the base station 105-a for each sub-band, a base station communication beam 220 at the base station 105-a for the carrier bandwidth, an order of preference for the sub-bands, or a combination thereof.

In some examples, the UE 115-a may receive the sets of CSI-RSs using a single UE communication beam 215. For example, the base station 105-a may transmit the sets of CSI-RSs by sweeping through a number of base station communication beams 220. The UE 115-a may receive the sets of CSI-RSs using the single UE communication beam 215 and may measure signal measurements of the received sets of CSI-RSs for each base station communication beam 220. Based on the signal measurements for each base station communication beam 220, the UE 115-a may determine the one or more preferred base station communication beams 220 for each of the sub-bands of the carrier and transmit the report 210 to the base station 105-a.

Additionally or alternatively, the base station 105-a may transmit repetitions of the sets of CSI-RSs using a same base station communication beam 220. The UE 115-a may receive the repeated sets of CSI-RSs by sweeping through a number of UE communication beams 215. The UE 115-a may measure signal measurements of the received sets of CSI-RSs for each UE communication beam 215 of the number of UE communication beams 215. Based on the signal measurements, the UE 115-a may select one or more preferred UE communication beams 215 for each sub-band of the carrier. For example, for each sub-band, the UE 115-a may identify a UE communication beam 215 associated with a strongest signal measurement and may select the UE communication beam 215 associated with the strongest signal measurement to communicate on the sub-band. Additionally or alternatively, the UE 115-a may transmit to the base station 105-a a report 210 that includes a preferred UE communication beam 215 for each sub-band, an order of preference for the UE communication beams 215 for each sub-band, a UE communication beam 215 for the carrier bandwidth, an order of preference for the sub-bands, or a combination thereof based on the same base station communication beam 220.

Figure 3:
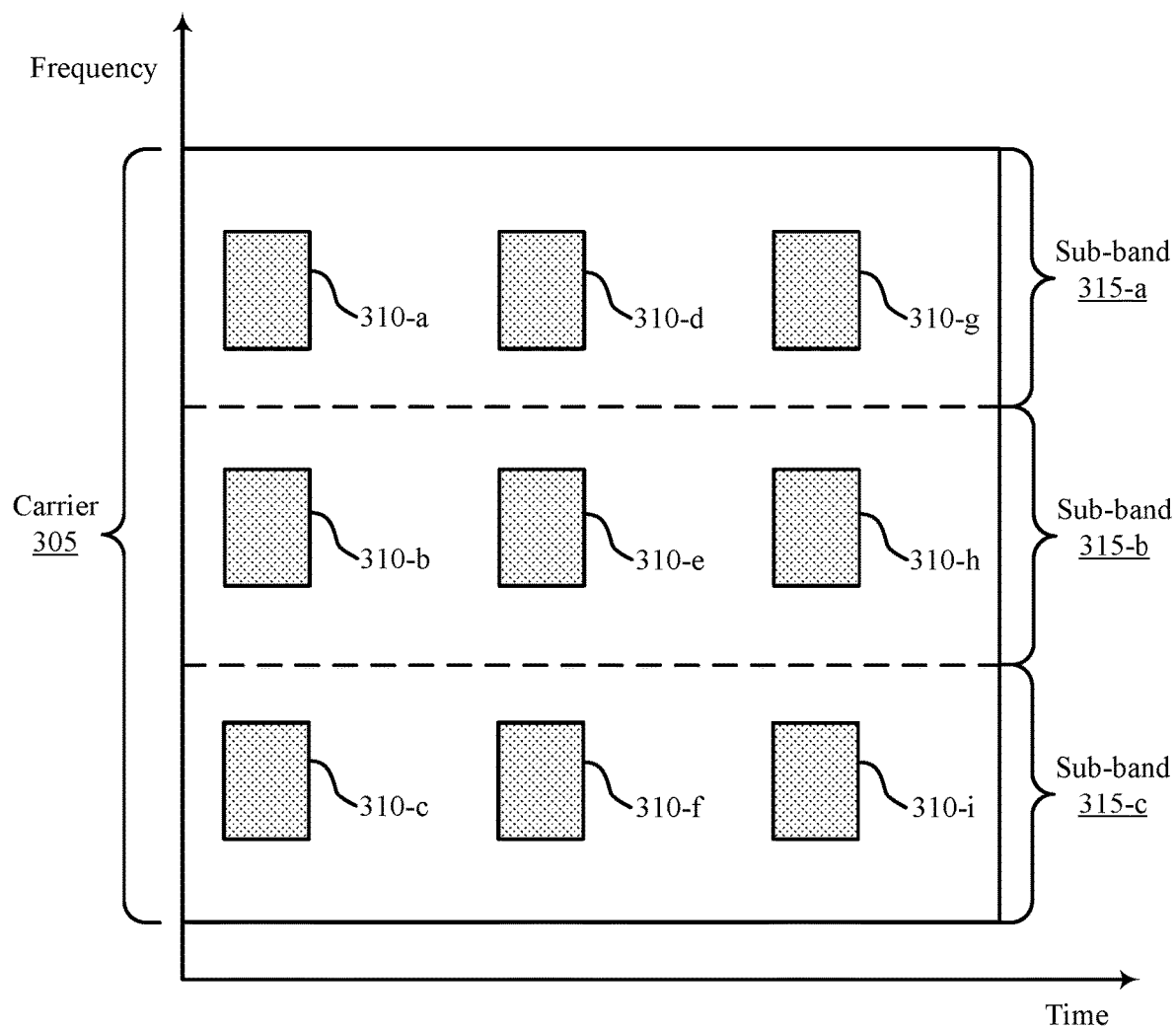
FIG. 3 illustrates an example of a carrier scheme that supports techniques for supporting wideband array operation in accordance with aspects of the present disclosure.

FIG. 3 illustrates an example of a carrier scheme 300 that supports techniques for supporting wideband array operation in accordance with aspects of the present disclosure. In some examples, the carrier scheme 300 may implement aspects of a wireless communications system 100 or 200 as described with reference to FIGS. 1 and 2. The carrier scheme 300 implementing sub-band-specific signals 310 may be based on a configuration by a base station 105 and may support high reliability communications in a wireless communications system (e.g., as compared to a configuration implementing carrier-specific signaling). The carrier scheme 300 may further decrease power consumption by a UE 115 receiving the sub-band-specific signals 310, among other benefits.

The carrier scheme 300 illustrates an example of a carrier 305 for downlink transmissions that includes sub-band-specific signaling. The carrier 305 (e.g., a component carrier) may span a bandwidth in a frequency domain. Different carriers 305 may span the same or different carrier bandwidths. In some cases, the carrier bandwidth may be divided into multiple sub-bands 315. For example, the base station 105 may configure the carrier bandwidth with different sub-bands 315 that each occupy a portion in frequency of the carrier bandwidth.

The base station 105 may transmit sub-band-specific signals 310 in the sub-bands 315. For example, the base station may transmit sub-band-specific signals 310-a, 310-d, and 310-g in a first sub-band 315-a, sub-band-specific signals 310-b, 310-e, and 310-h in a second sub-band 315-b, and sub-band-specific signals 310-c, 310-f, and 310-i in a third sub-band 315-c. Each of the sub-band-specific signals 310-a, 310-b, and 310-c may be repeated in the time domain. For example, sub-band-specific signals 310-d and 310-g may be examples of repetitions of the sub-band-specific signal 310-a; sub-band-specific signals 310-e and 310-h may be examples of repetitions of the sub-band-specific signal 310-b; and sub-band-specific signals 310-f and 310-i may be repetitions of the sub-band-specific signal 310-c. In some cases, the sub-band-specific signals 310-a, 310-b, and 310-c may each repeat according to a same repetition cadence. In some other cases, the sub-band-specific signals 310-a, 310-b, and 310-c may repeat according to one or more different repetition cadences. The sub-band-specific signals 310-a, 310-b, and 310-c may be transmitted concurrently on the carrier 305. In some examples, the base station 105 may configure a size of each of the sub-bands 315. In some other examples, the size of each sub-band 315 may be determined implicitly based on sub-band-specific signals 310 (e.g., SSBs). For example, the boundaries of the sub-bands 315 may be determined as the middle frequencies between the sub-band-specific signals 310 of consecutive sub-bands 315.

The UE 115 may receive a sub-band-specific signal 310 in a corresponding sub-band 315. In some cases, the UE 115 may receive the sub-band-specific signal 310-a in the first sub-band 315-a concurrently with the sub-band-specific signal 310-b in the second sub-band 315-b and the sub-band-specific signal 310-c in the third sub-band 315-c. The UE 115 may measure one or more signal measurements (e.g., RSRP, RSRQ, SNR, SINR, or other signal measurements) of each received sub-band-specific signal 310 and determine a communication beam to use for communicating on each sub-band 315 based on the one or more signal measurements of each sub-band-specific signal 310. For example, the UE 115 may measure one or more signal measurements of sub-band-specific signals 310-a, 310-b, and 310-c. The UE 115 may calculate a first difference value between a first signal measurement of sub-band-specific signal 310-a and a second signal measurement of sub-band-specific signal 310-b. Additionally, the UE 115 may calculate a second difference value between the second signal measurement of sub-band-specific signal 310-b and a third signal measurement of sub-band-specific signal 310-c. In some cases, the UE 115 may calculate multiple difference values based on a reference sub-band (e.g., a sub-band containing the center frequency of the carrier bandwidth). Additionally or alternatively, the UE 115 may calculate a single difference value between a maximum signal measurement and a minimum signal measurement for a same set of parameters (e.g., a same time and a same beam pair but for different sub-bands 315).

In an example, if the first difference value satisfies (e.g., is greater than or equal to) a threshold beam squint value (e.g., configured by the base station 105 or pre-configured at the UE 115), the UE 115 may determine to use a first communication beam to communicate on the first sub-band 315-a and a second communication beam to communicate on the second sub-band 315-b. If the second difference value also satisfies (e.g., is greater than or equal to) the threshold beam squint value, the UE 115 may further determine to use a third communication beam to communicate on the third sub-band 315-c. Alternatively, if the second difference value does not satisfy (e.g., is less than) the threshold beam squint value, the UE may determine to use the second communication beam to communicate on the second sub-band 315-b and the third sub-band 315-c. In another example, if no difference value satisfies the threshold beam squint value, the UE 115 may determine to use a same communication beam to communicate on the entire carrier bandwidth. If any difference value satisfies the threshold beam squint value, the UE 115 may separately determine communication beams to use for each sub-band 315.

In some cases, the UE 115 may determine one or more signal measurements for a repeated sub-band-specific signal 310 without measuring the repeated sub-band-specific signal 310. For example, the UE 115 may calculate the first difference value between the first signal measurement of the sub-band-specific signal 310-a and the second signal measurement of the sub-band-specific signal 310-b. The UE 115 may determine that the first difference value changes less than a threshold amount when receiving the repeated sub-band-specific signals 310-d and 310-e. The UE 115 may measure a third signal measurement of the repeated sub-band-specific signal 310-g and derive a fourth signal measurement of the repeated sub-band-specific signal 310-h using the first difference value (or an average of the difference values for sub-band-specific signals 310-a and 310-b and sub-band-specific signals 310-d and 310-e) and the third signal measurement.

In some examples, each of the sub-band-specific signals 310 may correspond to a set of SSB beams. For example, the sub-band-specific signal 310-a may represent an SSB sweep transmission instance across a set of SSB beams (e.g., an SSB transmitted using different base station transmit beams). The sub-band-specific signal 310-a may correspond to a first set of SSB beams, the sub-band-specific signal 310-b may correspond to a second set of SSB beams (e.g., the same or a different SSB transmitted using the same sweep of base station transmit beams in different frequency resources), and the sub-band-specific signal 310-c may correspond to a third set of SSB beams. In some cases, the UE 115 may receive the first set of SSB beams, the second set of SSB beams, and the third set of SSB beams using a set of receive beams. The UE 115 may measure a number of signal measurements of each set of SSB beams using the set of receive beams and may determine receive beams based on the signal measurements. In some cases, the UE 115 may generate a table or a subset of a table in memory indicating the determined receive beams. For example, if the base station 105 sweeps through sixty-four SSB beams in a sub-band-specific signal 310 and the sub-band-specific signals 310 are distributed across three sub-bands 315, the UE 115 may generate a sixty-four-by-three table indicating a UE receive beam index for each combination of base station transmit beam index and sub-band 315. In some cases, the UE 115 may create a subset of such a table (e.g., based on not receiving specific SSB beams, not obtaining measurements for specific sub-bands 315, or some similar reasoning). The determined UE receive beam for a specific base station transmit beam/sub-band combination may be based on comparing the signal measurement values for each UE receive beam receiving a signal from that specific base station transmit beam on that specific sub-band 315.

The base station 105 may configure a relationship between a raster frequency (e.g., a raster point or channel raster) for the carrier bandwidth of the carrier 305 and a frequency location of each set of SSB beams in the carrier bandwidth. For example, the base station 105 may transmit a first set of SSB beams (e.g., sub-band-specific signal 310-a) in a first location in frequency of the first sub-band 315-a, a second set of SSB beams (e.g., sub-band-specific signal 310-b) in a second location in frequency of the second sub-band 315-b, and a third set of SSB beams (e.g., sub-band-specific signal 310-c) in a third location in frequency of the third sub-band 315-c. The base station 105 may transmit each set of SSB beams such that the distance in frequency between the first location and the second location—and, similarly, a distance between the second location and the third location—is a function of the raster frequency. For example, the second location in frequency for receiving SSB beams may be located at a first raster point X megahertz (MHz) away from the first location in frequency for receiving SSB beams (e.g., where X=1000 MHz, X=2000 MHz, or X is some other pre-configured or configurable frequency interval for the sets of SSB beams). Thus, if the UE 115 detects the first set of SSB beams, the UE 115 may determine the frequency location in which to monitor for the second set of SSB beams. In this way, the UE 115 may refrain from monitoring the entire carrier bandwidth or an entire sub-band bandwidth for each set of SSB beams and instead may monitor at locations in frequency determined based on the raster frequency. In some cases, the carrier bandwidth may be associated with more than one raster frequency to determine the locations in frequency of each set of SSB beams. Additionally or alternatively, a minimum number of SSB beam locations, a maximum number of SSB beam locations, a minimum number of SSB beams, a maximum number of SSB beams, a minimum number of sub-bands, a maximum number of sub-bands, or some combination thereof may be configured for a carrier bandwidth (e.g., pre-configured for the UE 115-a or configured by the base station 105-a).

In some examples, each of the sub-band specific signals 310 may correspond to a set of CSI-RSs. For example, the sub-band-specific signal 310-a may correspond to a first set of CSI-RSs, the sub-band-specific signal 310-b may correspond to a second set of CSI-RSs, and the sub-band-specific signal 310-c may correspond to a third set of CSI-RSs. The UE 115 may receive the first set of CSI-RSs, the second set of CSI-RSs, and the third set of CSI-RSs from a set of transmit beams at the base station 105 using a set of receive beams. In some cases, the base station 105 may transmit the first set of CSI-RSs, the second set of CSI-RSs, and the third set of CSI-RSs using a same transmit beam. The UE 115 may measure a number of signal measurements for each set of CSI-RSs using the set of receive beams. The UE 115 may select a first receive beam for sub-band 315-a based on the first set of CSI-RSs, a second receive beam for sub-band 315-b based on the second set of CSI-RSs, and a third receive beam for sub-band 315-c based on the third set of CSI-RSs according to the signal measurements for each set of CSI-RSs. The UE 115 may additionally or alternatively determine a preferred transmit beam of the set of transmit beams for each of the sub-bands 315 of the carrier. For example, the UE 115 may select a first preferred transmit beam for the first sub-band 315-a, a second preferred transmit beam for the second sub-band 315-b, and a third preferred transmit beam for the third sub-band 315-c. The UE 115 may transmit a report to the base station 105 that includes the preferred transmit beams for each sub-band 315, an order of preference for the preferred transmit beams for each sub-band 315, a preferred transmit beam at the base station 105 for the carrier bandwidth, an order of preference for the sub-bands 315, or a combination thereof.

In some cases, the UE 115-a may group one or more sub-bands 315 together for reporting (e.g., based on bordering sub-bands, a difference threshold for measurements across the sub-bands, or some combination thereof). For example, the UE 115-a may report beam information (e.g., a preferred UE communication beam, a preferred base station communication beam, an order of preference for communication beams, signal measurements for communication beams or beam pairs, or some combination thereof) for sub-band 315-a, sub-band 315-b, sub-band 315-c, a combination of sub-bands 315-a and 315-b, a combination of sub-bands 315-b 315-c, a combination of sub-bands 315-a, 315-b, and 315-c (e.g., the full carrier bandwidth), or any combination thereof.

Figure 4:
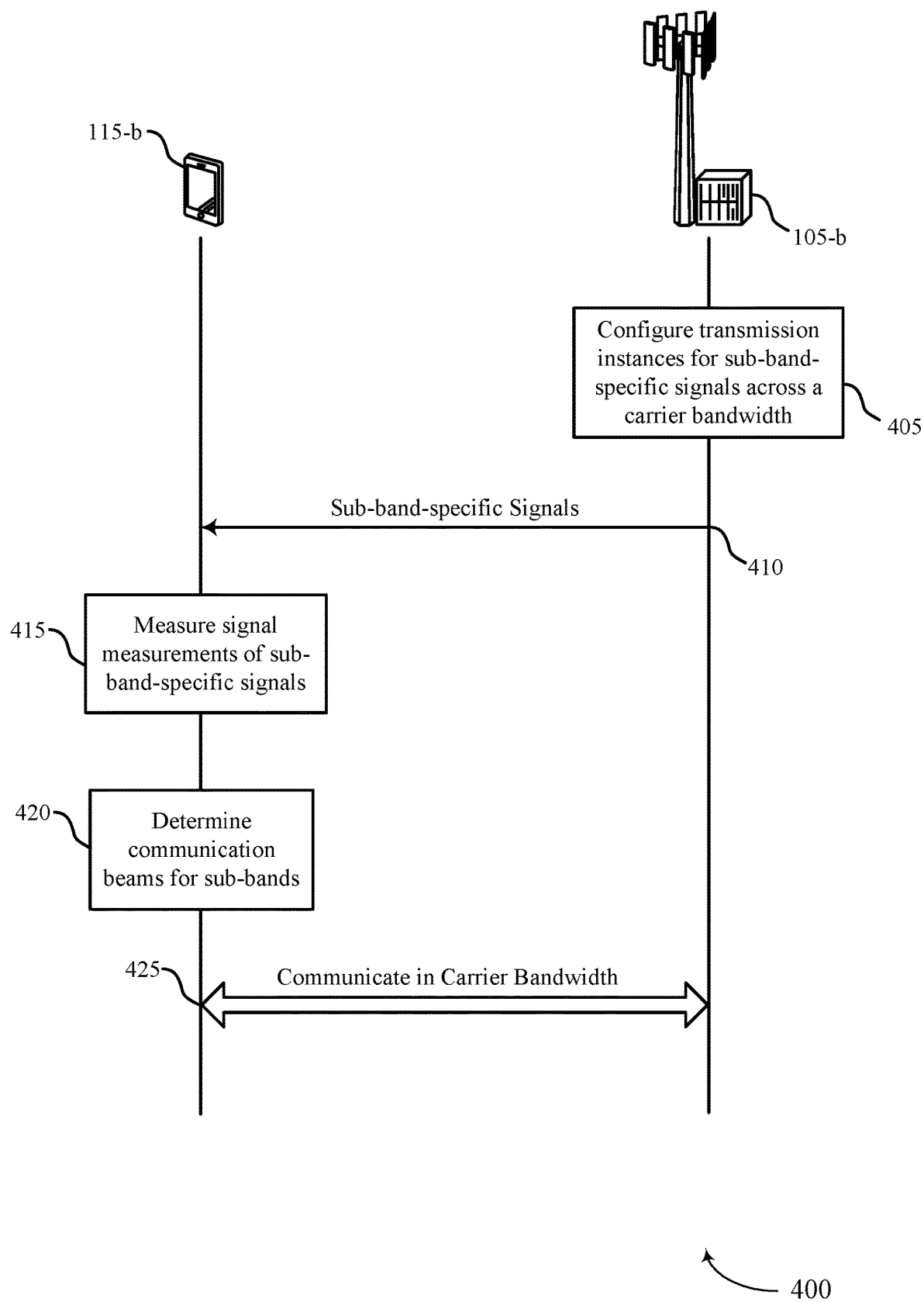
FIG. 4 illustrates an example of a process flow that supports techniques for supporting wideband array operation in accordance with aspects of the present disclosure.

FIG. 4 illustrates an example of a process flow 400 that supports techniques for supporting wideband array operation in accordance with aspects of the present disclosure. In some examples, the process flow 400 may implement aspects of a wireless communications system 100 or 200 as described with reference to FIGS. 1 and 2. The process flow 400 may be based on a configuration by a base station 105-b or a UE 115-b and may be implemented by the UE 115-b to support reliable communications for wideband array operations (e.g., in mmW systems). The process flow 400 may further be implemented by the UE 115-b to potentially reduce power consumption at the UE 115-b (e.g., based on reducing failed transmission and reception procedures at the UE 115-b), among other benefits.

The base station 105-b and the UE 115-b may be examples of a base station 105 and a UE 115, as described with reference to FIGS. 1 through 3. In the following description of the process flow 400, the operations between the base station 105-b and the UE 115-b may be communicated in a different order than the example order shown, or the operations performed by the base station 105-b and the UE 115-b may be performed in different orders or at different times. Some operations may also be omitted from the process flow 400, and other operations may be added to the process flow 400.

At 405, the base station 105-b may configure a set of transmission instances for a set of sub-band-specific signals across a carrier bandwidth. The carrier bandwidth may include a number of sub-bands and each sub-band-specific signal of the set of sub-band-specific signals may correspond to a sub-band of the carrier bandwidth. In some cases, the set of sub-band-specific signals may be SSB beams. In some other cases, the set of sub-band-specific signals may be CSI-RSs.

At 410, the base station 105-b may transmit the set of sub-band-specific signals in the set of configured transmission instances to the UE 115-b. For example, the base station 105-b may transmit a first sub-band-specific signal of the set of sub-band-specific signals in a first sub-band of the carrier bandwidth and a second sub-band-specific signal of the set of sub-band-specific signals in a second sub-band of the carrier bandwidth.

At 415, the UE 115-b may receive the set of sub-band-specific signals and may measure a number of signal measurements for each sub-band-specific signal of the set of sub-band-specific signals. For example, the UE 115-b may measure a first signal measurement of the first sub-band-specific signal and a second signal measurement of the second sub-band-specific signal.

At 420, the UE 115-b may determine a set of communication beams for the sub-bands of the carrier bandwidth based on measuring the number of signal measurements for each sub-band-specific signal. For example, the UE 115-b may determine a first communication beam of the set of communication beams for the first sub-band and a second communication beam of the set of communication beams for the second sub-band based on measuring the first signal measurement of the first sub-band-specific signal and the second signal measurement of the second sub-band-specific signal. In some cases, the UE 115-b may compare the first signal measurement to the second signal measurement and calculate a difference value between the first signal measurement and the second signal measurement. If the difference value satisfies a threshold for beam squint, the UE 115-b may select a first communication beam for the first sub-band and a second communication beam for the second sub-band based on the difference value satisfying the threshold. However, if the difference value fails to satisfy the threshold for beam squint, the UE 115-b may select a communication beam for the carrier bandwidth.

At 425, the UE 115-b may communicate with the base station 105-b in the carrier bandwidth according to the determined set of communication beams. For example, the UE 115-b may communicate with the base station 105-b using a carrier-specific beam pair or may communicate with the base station 105-b using sub-band-specific beam pairs.

Figure 5:
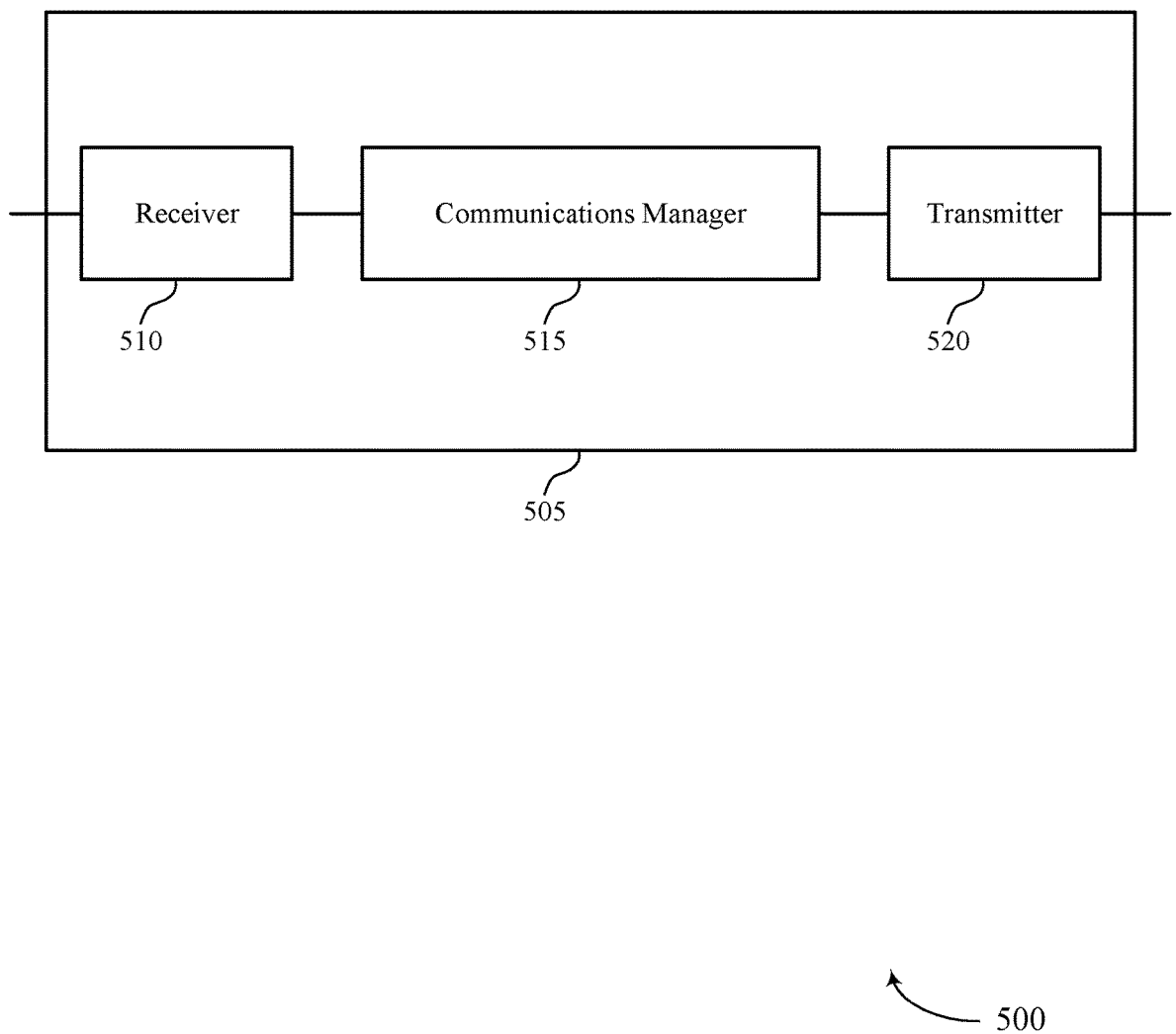
FIGS. 5 and 6 show diagrams of devices that support techniques for supporting wideband array operation in accordance with aspects of the present disclosure.

FIG. 5 shows a diagram 500 of a device 505 that supports techniques for supporting wideband array operation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for supporting wideband array operation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band, measure, for the set of signals, a set of signal measurement values corresponding to the set of sub-bands, determine a set of communication beams for the set of sub-bands based on the set of signal measurement values, where a first communication beam of the set of communication beams is determined for the first sub-band and a second communication beam different from the first communication beam is determined for the second sub-band, and communicate with the base station in the carrier bandwidth based on the determined set of communication beams. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The actions performed by the communications manager 515 as described herein may be implemented to realize one or more potential advantages. For example, communicating with a base station using different communication beams in different sub-bands across a carrier bandwidth may allow the UE to more accurately estimate channel characteristics of each sub-band. Accurately estimating channel characteristics across a carrier bandwidth may increase transmission reliability for wideband array operations. In some examples, communicating using multiple communication beams may further potentially reduce power consumption by reducing the number of failed transmission and reception procedures performed by the UE.

Based on communicating with a base station using multiple communication beams, a processor of the device 505 (e.g., a processor controlling the receiver 510, the communications manager 515, the transmitter 520, or a combination thereof) may reduce processing resources used for network connection procedures. For example, by reducing the number of times the device 505 fails to establish a connection with the network due to failed reception procedures, the device 505 may reduce processing overhead associated with establishing a connection with the network. Additionally or alternatively, the processor may reduce processing resources used to handle retransmissions due to signal degradation across the carrier bandwidth (e.g., by improving transmission or reception reliability, or both, based on using different communication beams in different sub-bands across the carrier bandwidth).

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
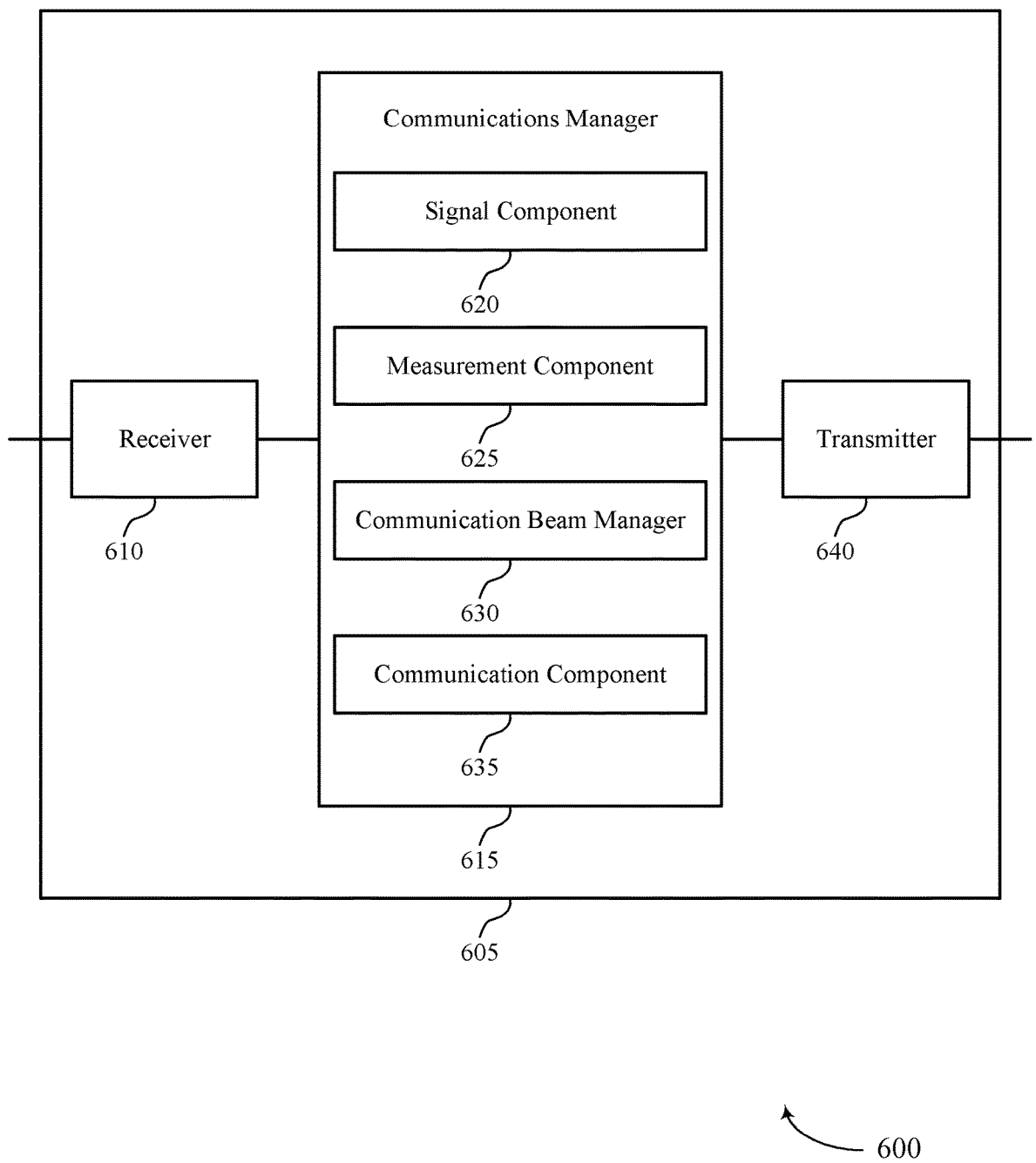

FIG. 6 shows a diagram 600 of a device 605 that supports techniques for supporting wideband array operation in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for supporting wideband array operation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a signal component 620, a measurement component 625, a communication beam manager 630, and a communication component 635. The communications manager 615 may be an example of aspects of the communications manager 810 described herein.

The signal component 620 may receive, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band. The measurement component 625 may measure, for the set of signals, a set of signal measurement values corresponding to the set of sub-bands. The communication beam manager 630 may determine a set of communication beams for the set of sub-bands based on the set of signal measurement values, where a first communication beam of the set of communication beams is determined for the first sub-band and a second communication beam different from the first communication beam is determined for the second sub-band. The communication component 635 may communicate with the base station in the carrier bandwidth based on the determined set of communication beams.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
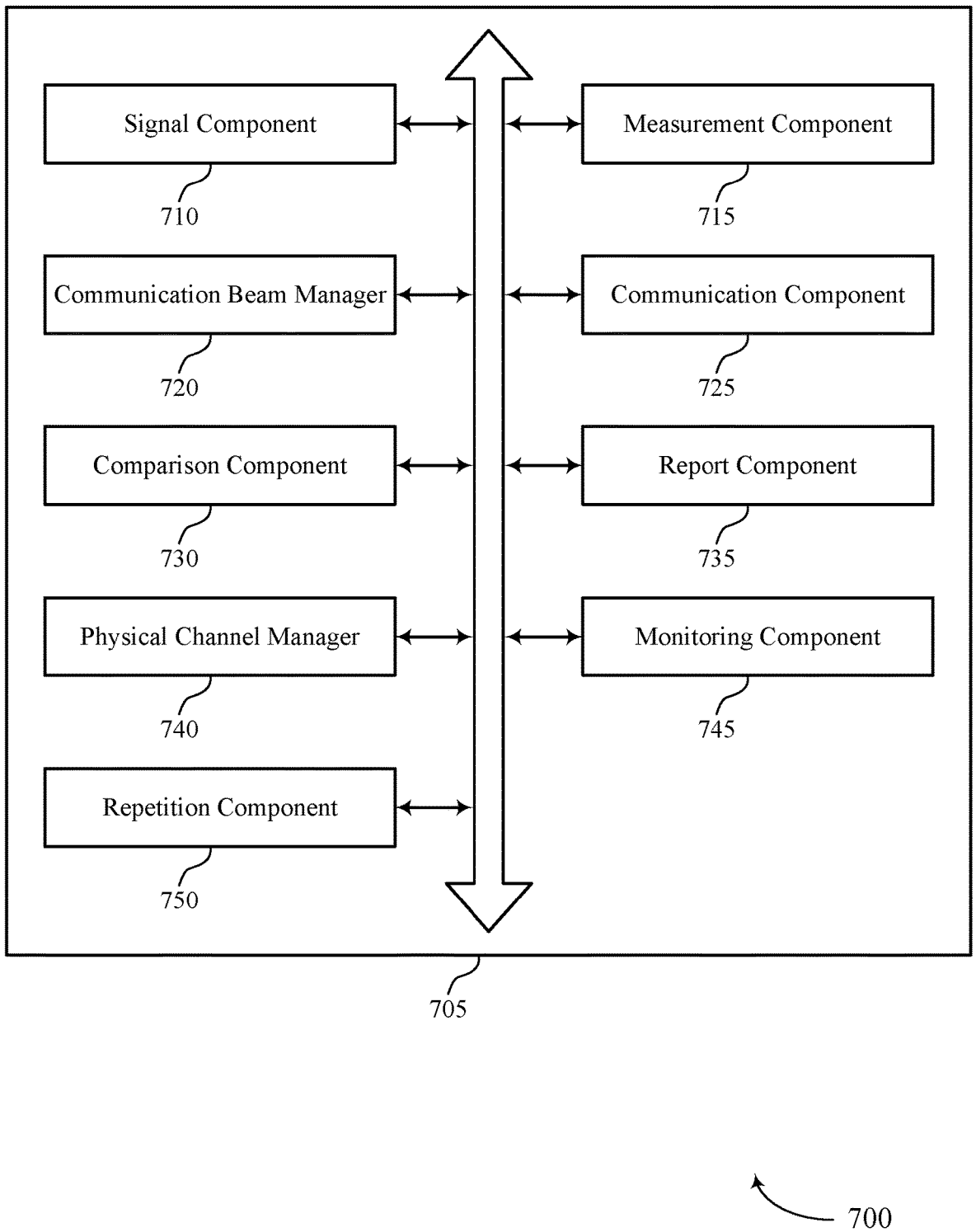
FIG. 7 shows a diagram of a communications manager that supports techniques for supporting wideband array operation in accordance with aspects of the present disclosure.

FIG. 7 shows a diagram 700 of a communications manager 705 that supports techniques for supporting wideband array operation in accordance with aspects of the present disclosure. The communications manager 705 may be an example of aspects of a communications manager 515, a communications manager 615, or a communications manager 810 described herein. The communications manager 705 may include a signal component 710, a measurement component 715, a communication beam manager 720, a communication component 725, a comparison component 730, a report component 735, a physical channel manager 740, a monitoring component 745, a repetition component 750, or some combination thereof. Each of these components may communicate, directly or indirectly, with one another (e.g., via one or more buses).

The signal component 710 may receive, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band. In some cases, the first signal and the second signal are received concurrently in the first sub-band and the second sub-band. In some examples, the signal component 710 may receive, from the base station, repetitions of the set of signals across the carrier bandwidth for a time period. In some implementations, the signal component 710 may receive, from the base station, a repeated first signal in the first sub-band in a subsequent slot.

In some cases, the set of signals includes a set of SSBs. In some examples, the receiving further includes receiving a set of sets of SSB beams across the carrier bandwidth using a set of receive beams, where a first set of SSB beams of the set of sets of SSB beams is received in the first sub-band and a second set of SSB beams of the set of sets of SSB beams is received in the second sub-band. In some cases, a first SSB sequence for the first set of SSB beams received in the first sub-band is the same as a second SSB sequence for the second set of SSB beams received in the second sub-band. In some other cases, a first SSB sequence for the first set of SSB beams received in the first sub-band is different from a second SSB sequence for the second set of SSB beams received in the second sub-band. In some examples, the first SSB sequence is based on the first sub-band, and the second SSB sequence is based on the second sub-band.

In some cases, the set of signals includes a set of CSI-RSs. In some examples, the receiving further includes receiving a set of sets of CSI-RSs across the carrier bandwidth using a receive beam, where a first set of CSI-RSs of the set of sets of CSI-RSs is received in the first sub-band from a set of transmit beams at the base station and a second set of CSI-RSs of the set of sets of CSI-RSs is received in the second sub-band from the set of transmit beams at the base station. In some other cases, the receiving further includes receiving the set of CSI-RSs across the carrier bandwidth using a set of receive beams, where a first CSI-RS of the set of CSI-RSs is received in the first sub-band using the set of receive beams and a second CSI-RS of the set of CSI-RSs is received in the second sub-band using the set of receive beams.

The measurement component 715 may measure, for the set of signals, a set of signal measurement values corresponding to the set of sub-bands. In some examples, the measurement component 715 may measure, for the repeated first signal, the first signal measurement value in the subsequent slot. In some implementations, the measurement component 715 may derive the second signal measurement value in the subsequent slot based on the difference value and determining that the difference value changes less than the threshold amount.

In some examples, the set of signal measurement values includes a set of RSRP measurements, a set of RSRQ measurements, a set of SNR measurements, a set of SINR measurements, or a combination thereof. In some cases, the set of signal measurement values is based on a center frequency for the carrier bandwidth, a transmit bandwidth for the carrier bandwidth, an antenna array configuration for the base station, a beam pattern, a location of the UE relative to the base station, or a combination thereof.

The communication beam manager 720 may determine a set of communication beams for the set of sub-bands based on the set of signal measurement values, where a first communication beam of the set of communication beams is determined for the first sub-band and a second communication beam different from the first communication beam is determined for the second sub-band. In some examples, the determining further includes selecting a receive beam of the set of receive beams for each SSB beam of the set of sets of SSB beams for each sub-band of the set of sub-bands. In some cases, the determining further includes selecting a set of transmit beams of the set of transmit beams at the base station for the set of sub-bands. In some implementations, the determining further includes selecting a set of receive beams of the set of receive beams for the set of sub-bands, where the communicating with the base station in the carrier bandwidth is further based on the selecting. In some cases, the set of communication beams includes a set of UE receive beams, a set of base station transmit beams, a set of UE transmit beams, a set of base station receive beams, or a combination thereof.

In some examples, the communication beam manager 720 may select one or more communication beams of the set of communication beams for communicating in the carrier bandwidth based on the comparing, where the communicating with the base station in the carrier bandwidth is further based on the selected one or more communication beams.

In some examples, the communication beam manager 720 may receive, from the base station, a configuration message indicating for the UE to communicate using sub-band-specific communication beams. In some cases, the communication beam manager 720 may select the set of communication beams for communicating in the set of sub-bands of the carrier bandwidth based on the configuration message. In some implementations, the communication beam manager 720 may receive, from the base station, a configuration message indicating the set of sub-bands configured for the carrier bandwidth, where determining the set of communication beams is based on the set of sub-bands configured for the carrier bandwidth. In some cases, the configuration message includes an RRC message, a MAC-CE, a DCI message, or a combination thereof.

In some examples, the communication beam manager 720 may identify the set of sub-bands based on the received set of sets of SSB beams, where determining the set of communication beams is based on the identified set of sub-bands.

The communication component 725 may communicate with the base station in the carrier bandwidth based on the determined set of communication beams. In some examples, the communication component 725 may communicate with the base station in the carrier bandwidth using a sub-band-specific receive beam of the set of receive beams, a sub-band-specific SSB beam of the set of sets of SSB beams, or a combination thereof based on the selecting. In some cases, the communication component 725 may communicate one or more messages using an orthogonal frequency-division multiplexing waveform.

The comparison component 730 may compare a first signal measurement value of the set of signal measurement values for the first signal to a second signal measurement value of the set of signal measurement values for the second signal. In some examples, the comparison component 730 may calculate a difference value between the first signal measurement value and the second signal measurement value. In some cases, the comparison component 730 may compare the difference value to a threshold value for beam squint, where selecting the one or more communication beams includes selecting a communication beam for the carrier bandwidth if the difference value fails to satisfy the threshold value for beam squint and selecting the one or more communication beams includes selecting the set of communication beams for the set of sub-bands if the difference value satisfies the threshold value for beam squint. In some examples, the comparison component 730 may determine that the difference value between the first signal measurement value and the second signal measurement value changes less than a threshold amount during the time period.

The report component 735 may transmit, to the base station, a measurement report including respective information for each sub-band of the set of sub-bands based on the determined set of communication beams for the set of sub-bands.

In some examples, the report component 735 may transmit, to the base station and based on the selecting, a report message including a preferred sub-band of the set of sub-bands, an order of preference for the set of sub-bands, or a combination thereof. In some cases, the measurement report includes a preferred communication beam for each sub-band of the set of sub-bands, an order of preference for communication beams for each sub-band of the set of sub-bands, a preferred communication beam for one or more combinations of sub-bands of the set of sub-bands, an order of preference for communication beams for one or more combinations of sub-bands of the set of sub-bands, an order of preference for communication beams for the carrier bandwidth, an order of preference for the set of sub-bands, or a combination thereof.

In some examples, the report component 735 may transmit, to the base station, a report message including a set of TCI states corresponding to the set of sub-bands, where the report message includes a first TCI state of the set of TCI states for the first sub-band and a second TCI state of the set of TCI states different from the first TCI state for the second sub-band.

In some cases, the report component 735 may transmit, to the base station and based on selecting a plurality of transmit beams of the set of transmit beams for the plurality of sub-bands, a report message including a preferred transmit beam at the base station for each sub-band of the set of sub-bands, an order of preference for transmit beams at the base station for each sub-band of the set of sub-bands, a transmit beam at the base station for the carrier bandwidth, an order of preference for the set of sub-bands, or a combination thereof.

The physical channel manager 740 may select, from the determined set of communication beams, a subset of communication beams for communicating on a set of physical channels, where the first communication beam is selected for a first physical channel of the set of physical channels and the second communication beam is selected for a second physical channel of the set of physical channels. In some examples, the physical channel manager 740 may identify a resource occasion configured for a physical channel of the set of physical channels, where a communication beam is selected for the physical channel based on the resource occasion configured for the physical channel and a sub-band of the set of sub-bands corresponding to the resource occasion. In some cases, the resource occasion is identified for the physical channel based on remaining minimum system information, other system information, or a combination thereof. In some implementations, the physical channel includes a physical control channel, a physical data channel, a PRACH, a physical feedback channel, or a combination thereof.

The monitoring component 745 may monitor for the set of sets of SSB beams across the carrier bandwidth based on one or more raster frequencies for the carrier bandwidth, where receiving the set of sets of SSB beams is based on the monitoring. In some examples, monitoring for a set of SSB beams from one or more neighboring base stations, where the monitoring includes monitoring for a first set of SSB beams in the first sub-band and monitoring for a second set of SSB beams in the second sub-band, monitoring for the set of SSB beams in a specific sub-band of the carrier bandwidth, determining a monitoring configuration based on a trigger event, or a combination thereof.

The repetition component 750 may determine a set of repetition cadences for receiving the set of signals across the carrier bandwidth, where the first signal and a repeated first signal are received in the first sub-band according to a first repetition cadence of the set of repetition cadences and the second signal and a repeated second signal are received in the second sub-band according to a second repetition cadence of the set of repetition cadences different from the first repetition cadence.

Figure 8:
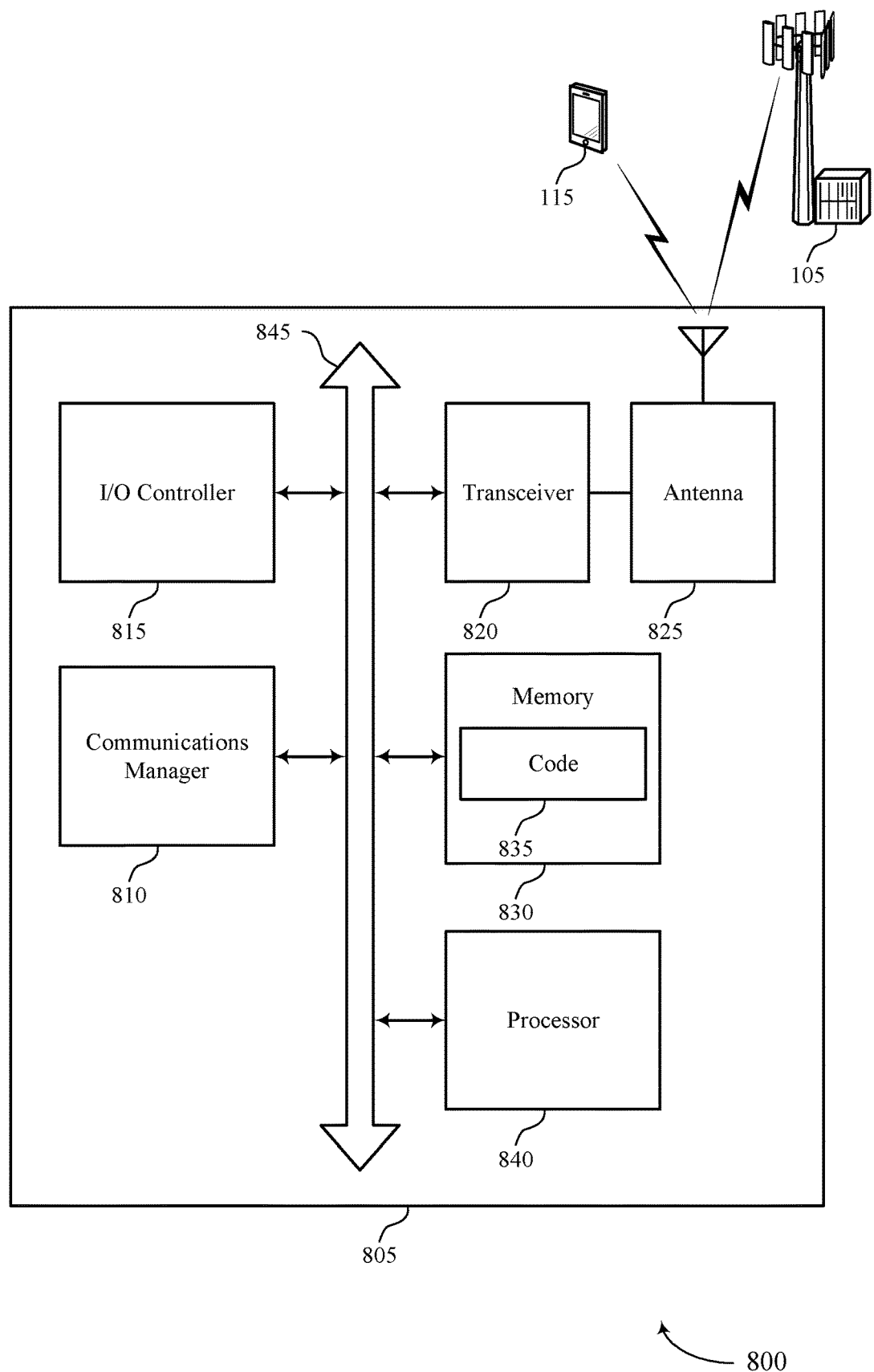
FIG. 8 shows a diagram of a system including a device that supports techniques for supporting wideband array operation in accordance with aspects of the present disclosure.

FIG. 8 shows a diagram of a system 800 including a device 805 that supports techniques for supporting wideband array operation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band, measure, for the set of signals, a set of signal measurement values corresponding to the set of sub-bands, determine a set of communication beams for the set of sub-bands based on the set of signal measurement values, where a first communication beam of the set of communication beams is determined for the first sub-band and a second communication beam different from the first communication beam is determined for the second sub-band, and communicate with the base station in the carrier bandwidth based on the determined set of communication beams.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for supporting wideband array operation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
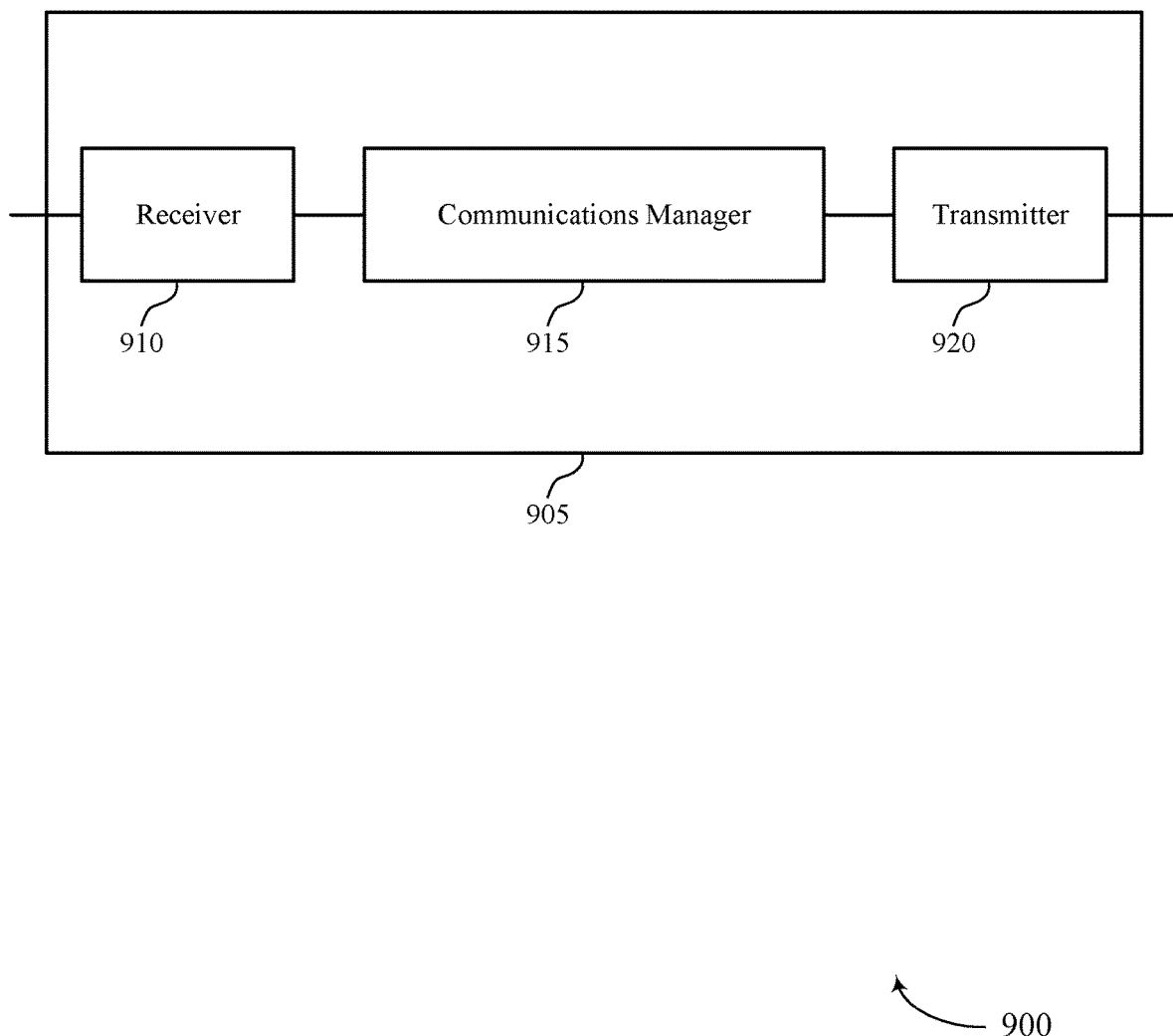
FIGS. 9 and 10 show diagrams of devices that support techniques for supporting wideband array operation in accordance with aspects of the present disclosure.

FIG. 9 shows a diagram 900 of a device 905 that supports techniques for supporting wideband array operation in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for supporting wideband array operation, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may configure a set of transmissions instances for a set of signals across a carrier bandwidth including a set of sub-bands, where at least one transmission instance of the set of transmissions instances is configured in each sub-band of the set of sub-bands, transmit, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band, and communicate with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
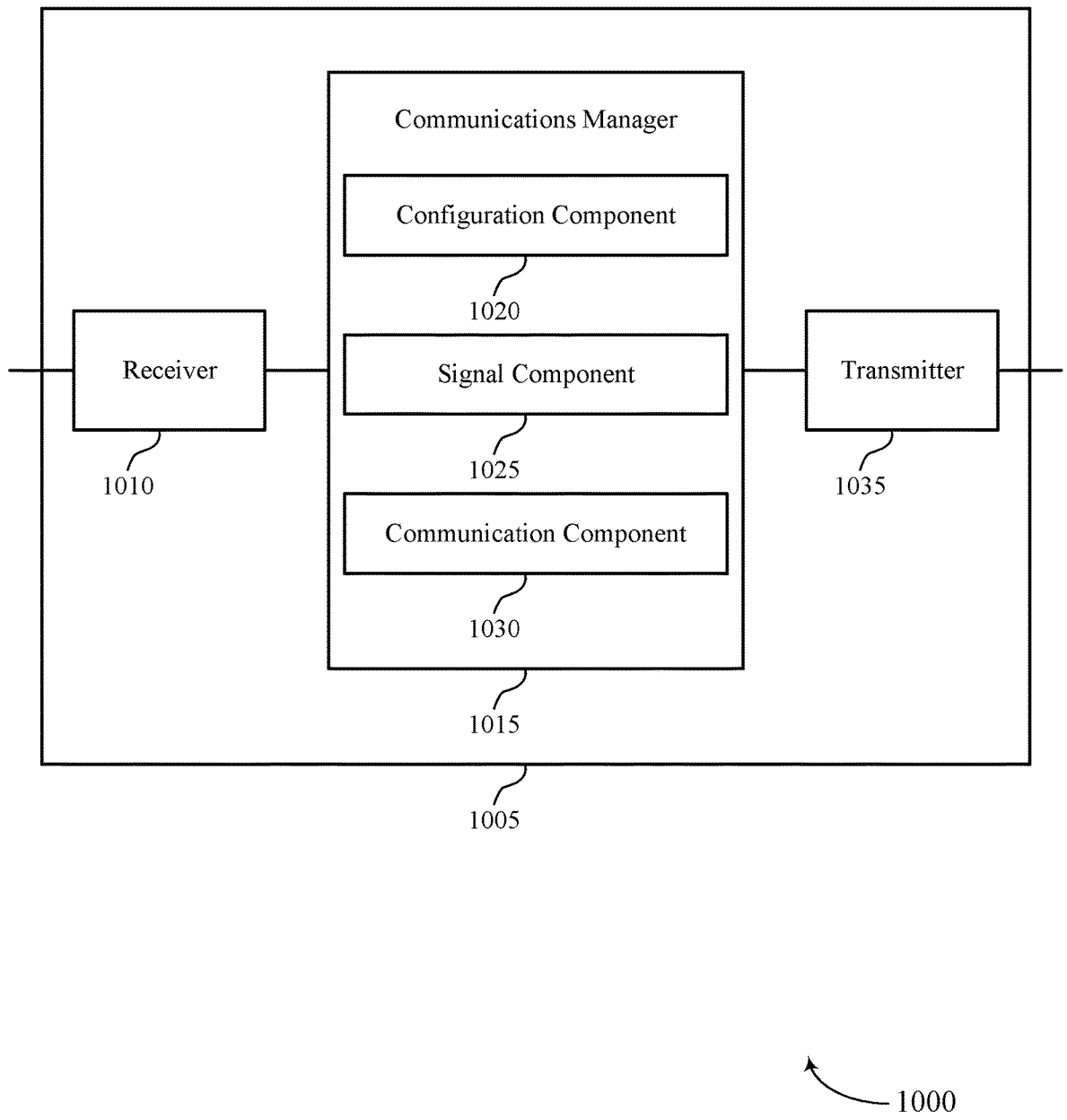

FIG. 10 shows a diagram 1000 of a device 1005 that supports techniques for supporting wideband array operation in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for supporting wideband array operation, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration component 1020, a signal component 1025, and a communication component 1030. The communications manager 1015 may be an example of aspects of the communications manager 1210 described herein.

The configuration component 1020 may configure a set of transmissions instances for a set of signals across a carrier bandwidth including a set of sub-bands, where at least one transmission instance of the set of transmissions instances is configured in each sub-band of the set of sub-bands. The signal component 1025 may transmit, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band. The communication component 1030 may communicate with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
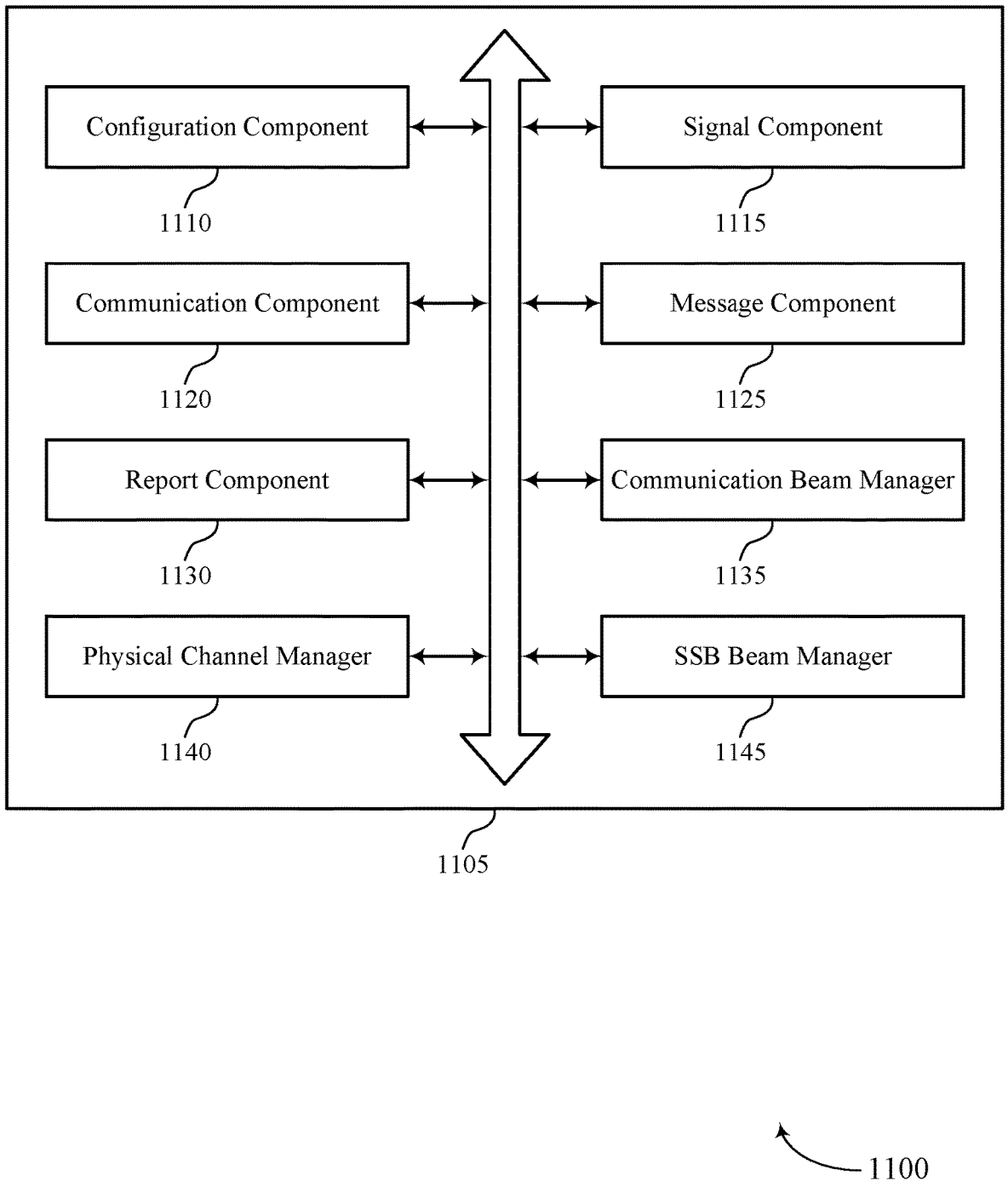
FIG. 11 shows a diagram of a communications manager that supports techniques for supporting wideband array operation in accordance with aspects of the present disclosure.

FIG. 11 shows a diagram 1100 of a communications manager 1105 that supports techniques for supporting wideband array operation in accordance with aspects of the present disclosure. The communications manager 1105 may be an example of aspects of a communications manager 915, a communications manager 1015, or a communications manager 1210 described herein. The communications manager 1105 may include a configuration component 1110, a signal component 1115, a communication component 1120, a message component 1125, a report component 1130, a communication beam manager 1135, a physical channel manager 1140, an SSB beam manager 1145, or some combination thereof. Each of these components may communicate, directly or indirectly, with one another (e.g., via one or more buses).

The configuration component 1110 may configure a set of transmissions instances for a set of signals across a carrier bandwidth including a set of sub-bands, where at least one transmission instance of the set of transmissions instances is configured in each sub-band of the set of sub-bands. In some examples, the configuration component 1110 may configure the set of sub-bands for the carrier bandwidth, where configuring the set of transmissions instances is based on the configured set of sub-bands for the carrier bandwidth. In some cases, the set of signals includes a set of SSBs. In some implementations, the set of signals includes a set of CSI-RSs.

The signal component 1115 may transmit, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band. In some cases, the first signal and the second signal are transmitted concurrently in the first sub-band and the second sub-band. In some examples, the transmitting further includes transmitting a set of sets of SSB beams across the carrier bandwidth, where a first set of SSB beams of the set of sets of SSB beams is transmitted in the first sub-band and a second set of SSB beams of the set of sets of SSB beams is transmitted in the second sub-band.

In some cases, the transmitting further includes transmitting a set of sets of CSI-RSs across the carrier bandwidth using a set of transmit beams, where a first set of CSI-RSs of the set of sets of CSI-RSs is transmitted in the first sub-band using the set of transmit beams and a second set of CSI-RSs of the set of sets of CSI-RSs is transmitted in the second sub-band using the set of transmit beams. In some cases, the transmitting further includes transmitting a set of CSI-RSs across the carrier bandwidth using a transmit beam, where a first CSI-RS of the set of CSI-RSs is transmitted in the first sub-band using the transmit beam and a second CSI-RS of the set of CSI-RSs is transmitted in the second sub-band using the transmit beam.

The communication component 1120 may communicate with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band. In some examples, the communication component 1120 may identify the set of sub-bands based on the configured set of transmissions instances. In some cases, the communication component 1120 may communicate one or more messages using an orthogonal frequency-division multiplexing waveform. In some implementations, the set of communication beams includes a set of UE receive beams, a set of base station transmit beams, a set of UE transmit beams, a set of base station receive beams, or a combination thereof.

The message component 1125 may transmit, to the UE, a configuration message indicating for the UE to communicate using sub-band-specific communication beams, where the communicating in the carrier bandwidth using the set of communication beams is based on the configuration message. In some examples, the message component 1125 may transmit, to the UE, a configuration message indicating the configured set of sub-bands for the carrier bandwidth. In some cases, the configuration message includes a RRC message, a MAC-CE, a DCI message, or a combination thereof.

The report component 1130 may receive, from the UE, a measurement report including respective information for each sub-band of the set of sub-bands based on the transmitted set of signals. In some cases, the measurement report includes a preferred communication beam for each sub-band of the set of sub-bands, an order of preference for communication beams for each sub-band of the set of sub-bands, a preferred communication beam for one or more combinations of sub-bands of the set of sub-bands, an order of preference for communication beams for one or more combinations of sub-bands of the set of sub-bands, an order of preference for communication beams for the carrier bandwidth, an order of preference for the set of sub-bands, or a combination thereof.

In some examples, the report component 1130 may receive, from the UE and based on the transmitted set of signals, a report message including a set of TCI states corresponding to the set of sub-bands, where the report message includes a first TCI state of the set of TCI states for the first sub-band and a second TCI state of the set of TCI states different from the first TCI state for the second sub-band.

In some cases, the report component 1130 may receive, from the UE, a report message including a preferred transmit beam of the set of transmit beams for each sub-band of the set of sub-bands, an order of preference for the set of transmit beams for each sub-band of the set of sub-bands, a transmit beam of the set of transmit beams for the carrier bandwidth, an order of preference for the set of sub-bands, or a combination thereof.

In some cases, the report component 1130 may receive, from the UE, a report message including a preferred sub-band of the set of sub-bands, an order of preference for the set of sub-bands, or a combination thereof.

The communication beam manager 1135 may determine the set of communication beams for the set of sub-bands based on the measurement report.

The physical channel manager 1140 may configure a set of resource occasions for a set of physical channels for the UE, where one or more SSBs of the set of SSBs indicate the set of resource occasions for the set of physical channels. In some examples, the physical channel manager 1140 may configure a set of sets of resource occasions for a set of physical channels for the UE, where the first set of SSB beams indicates a first set of resource occasions of the set of sets of resource occasions for the set of physical channels and the second set of SSB beams indicates a second set of resource occasions of the set of sets of resource occasions different from the first set of resource occasions for the set of physical channels.

The SSB beam manager 1145 may determine a first group of SSB beams and a second group of SSB beams based on an antenna array configuration for the base station, where the first group of SSB beams includes the set of sets of SSB beams. In some examples, the SSB beam manager 1145 may transmit, to the UE, a system information message indicating the first group of SSB beams to receive across the carrier bandwidth. In some examples, the SSB beam manager 1145 may transmit the second group of SSB beams in a specific sub-band of the set of sub-bands for the carrier bandwidth. In some cases, a first SSB sequence for the first set of SSB beams transmitted in the first sub-band is the same as a second SSB sequence for the second set of SSB beams transmitted in the second sub-band. In some other cases, a first SSB sequence for the first set of SSB beams transmitted in the first sub-band is different from a second SSB sequence for the second set of SSB beams transmitted in the second sub-band.

Figure 12:
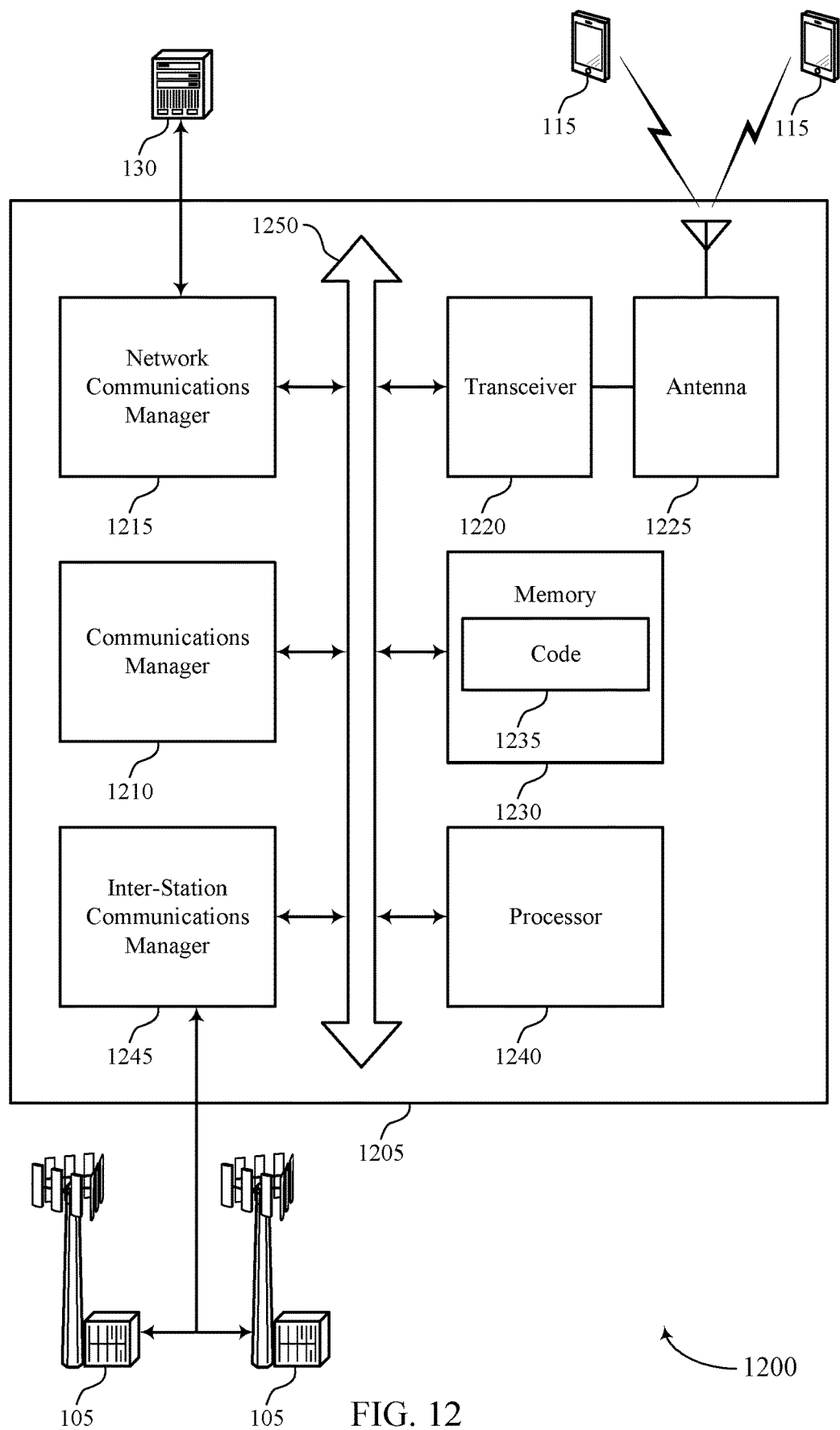
FIG. 12 shows a diagram of a system including a device that supports techniques for supporting wideband array operation in accordance with aspects of the present disclosure.

FIG. 12 shows a diagram of a system 1200 including a device 1205 that supports techniques for supporting wideband array operation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may configure a set of transmissions instances for a set of signals across a carrier bandwidth including a set of sub-bands, where at least one transmission instance of the set of transmissions instances is configured in each sub-band of the set of sub-bands, transmit, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band, and communicate with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for supporting wideband array operation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
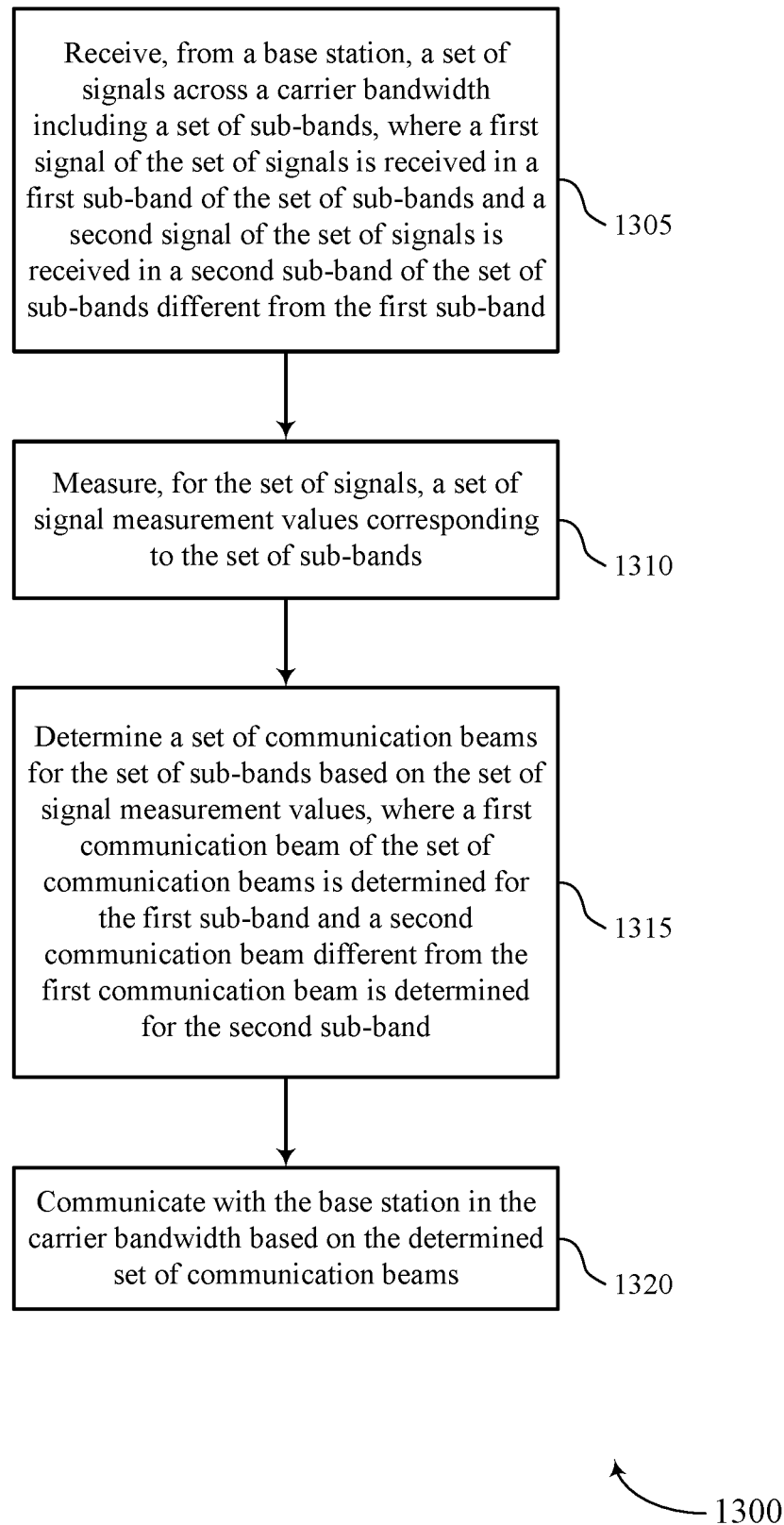
FIGS. 13 through 16 show flowcharts illustrating methods that support techniques for supporting wideband array operation in accordance with aspects of the present disclosure.

FIG. 13 shows a flowchart illustrating a method 1300 that supports techniques for supporting wideband array operation in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band. The operations of 1305 may be performed according to the methods described herein. In some examples, aspects of the operations of 1305 may be performed by a signal component as described with reference to FIGS. 5 through 8.

At 1310, the UE may measure, for the set of signals, a set of signal measurement values corresponding to the set of sub-bands. The operations of 1310 may be performed according to the methods described herein. In some examples, aspects of the operations of 1310 may be performed by a measurement component as described with reference to FIGS. 5 through 8.

At 1315, the UE may determine a set of communication beams for the set of sub-bands based on the set of signal measurement values, where a first communication beam of the set of communication beams is determined for the first sub-band and a second communication beam different from the first communication beam is determined for the second sub-band. The operations of 1315 may be performed according to the methods described herein. In some examples, aspects of the operations of 1315 may be performed by a communication beam manager as described with reference to FIGS. 5 through 8.

At 1320, the UE may communicate with the base station in the carrier bandwidth based on the determined set of communication beams. The operations of 1320 may be performed according to the methods described herein. In some examples, aspects of the operations of 1320 may be performed by a communication component as described with reference to FIGS. 5 through 8.

Figure 14:
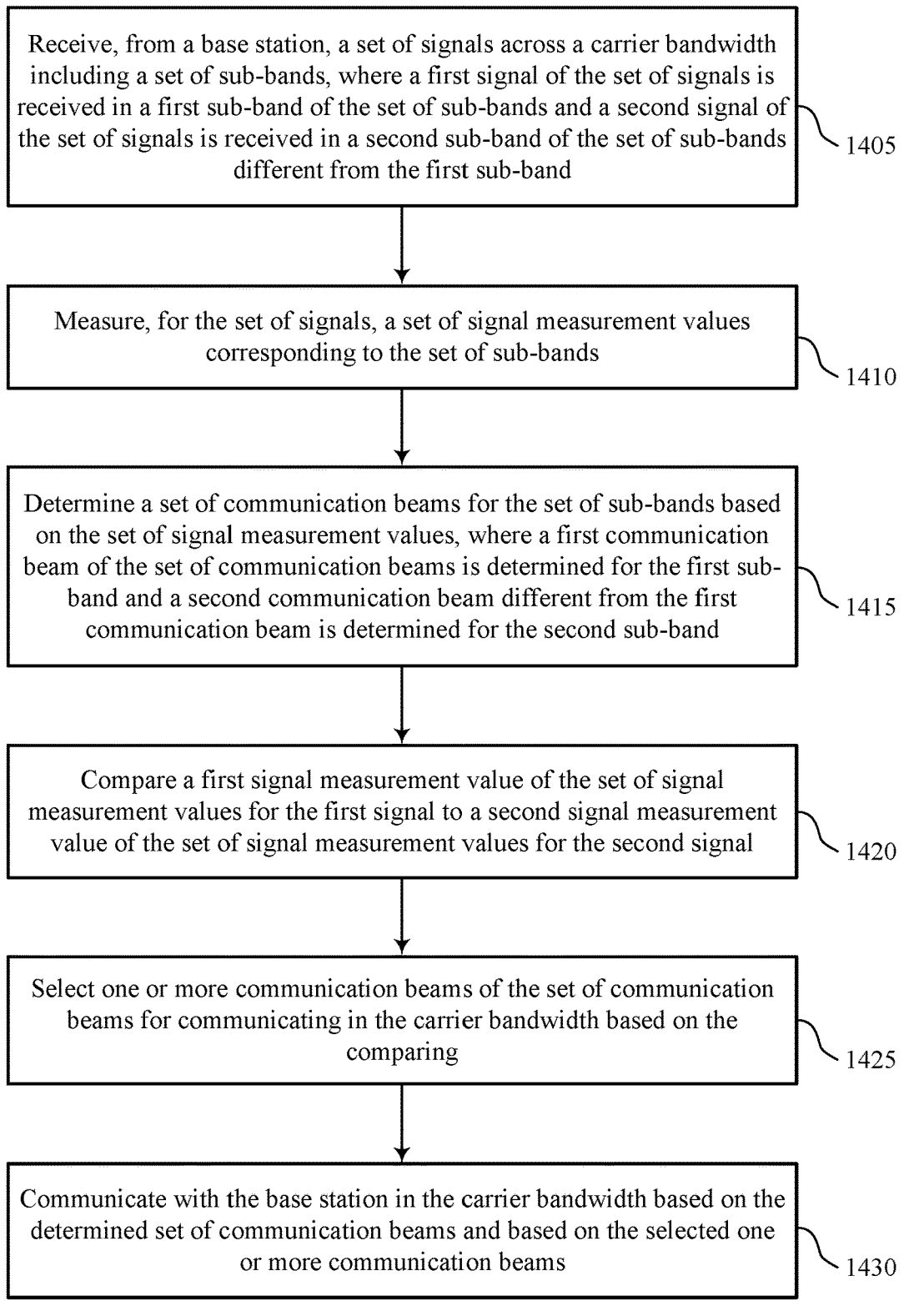

FIG. 14 shows a flowchart illustrating a method 1400 that supports techniques for supporting wideband array operation in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a set of signals across a carrier bandwidth including a set of sub-bands, where a first signal of the set of signals is received in a first sub-band of the set of sub-bands and a second signal of the set of signals is received in a second sub-band of the set of sub-bands different from the first sub-band. The operations of 1405 may be performed according to the methods described herein. In some examples, aspects of the operations of 1405 may be performed by a signal component as described with reference to FIGS. 5 through 8.

At 1410, the UE may measure, for the set of signals, a set of signal measurement values corresponding to the set of sub-bands. The operations of 1410 may be performed according to the methods described herein. In some examples, aspects of the operations of 1410 may be performed by a measurement component as described with reference to FIGS. 5 through 8.

At 1415, the UE may determine a set of communication beams for the set of sub-bands based on the set of signal measurement values, where a first communication beam of the set of communication beams is determined for the first sub-band and a second communication beam different from the first communication beam is determined for the second sub-band. The operations of 1415 may be performed according to the methods described herein. In some examples, aspects of the operations of 1415 may be performed by a communication beam manager as described with reference to FIGS. 5 through 8.

At 1420, the UE may compare a first signal measurement value of the set of signal measurement values for the first signal to a second signal measurement value of the set of signal measurement values for the second signal. The operations of 1420 may be performed according to the methods described herein. In some examples, aspects of the operations of 1420 may be performed by a comparison component as described with reference to FIGS. 5 through 8.

At 1425, the UE may select one or more communication beams of the set of communication beams for communicating in the carrier bandwidth based on the comparing. The operations of 1425 may be performed according to the methods described herein. In some examples, aspects of the operations of 1425 may be performed by a communication beam manager as described with reference to FIGS. 5 through 8.

At 1430, the UE may communicate with the base station in the carrier bandwidth based on the determined set of communication beams and based on the selected one or more communication beams. The operations of 1430 may be performed according to the methods described herein. In some examples, aspects of the operations of 1430 may be performed by a communication component as described with reference to FIGS. 5 through 8.

Figure 15:
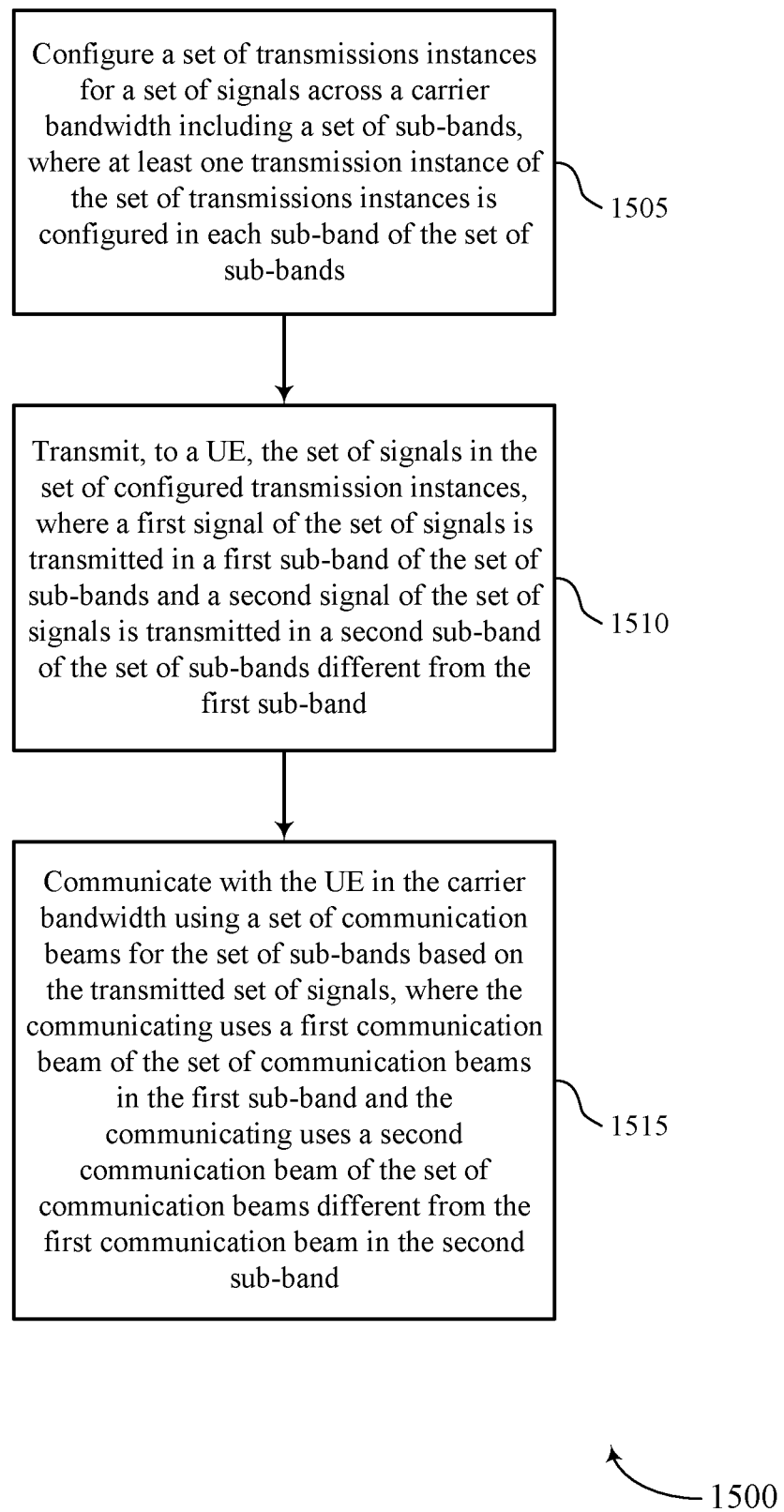

FIG. 15 shows a flowchart illustrating a method 1500 that supports techniques for supporting wideband array operation in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may configure a set of transmissions instances for a set of signals across a carrier bandwidth including a set of sub-bands, where at least one transmission instance of the set of transmissions instances is configured in each sub-band of the set of sub-bands. The operations of 1505 may be performed according to the methods described herein. In some examples, aspects of the operations of 1505 may be performed by a configuration component as described with reference to FIGS. 9 through 12.

At 1510, the base station may transmit, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band. The operations of 1510 may be performed according to the methods described herein. In some examples, aspects of the operations of 1510 may be performed by a signal component as described with reference to FIGS. 9 through 12.

At 1515, the base station may communicate with the UE in the carrier bandwidth using a set of communication beams for the set of sub-bands based on the transmitted set of signals, where the communicating uses a first communication beam of the set of communication beams in the first sub-band and the communicating uses a second communication beam of the set of communication beams different from the first communication beam in the second sub-band. The operations of 1515 may be performed according to the methods described herein. In some examples, aspects of the operations of 1515 may be performed by a communication component as described with reference to FIGS. 9 through 12.

Figure 16:
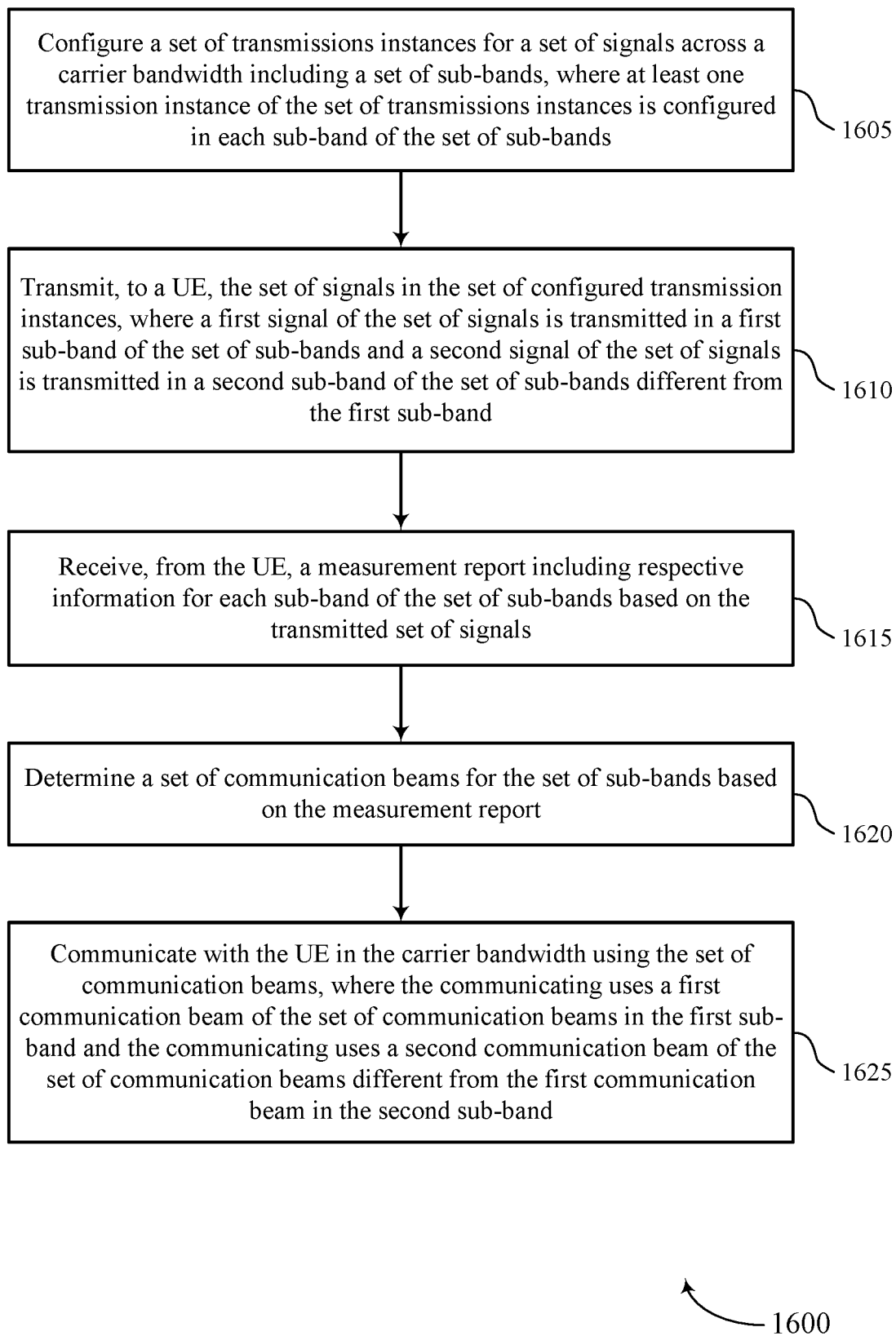

FIG. 16 shows a flowchart illustrating a method 1600 that supports techniques for supporting wideband array operation in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may configure a set of transmissions instances for a set of signals across a carrier bandwidth including a set of sub-bands, where at least one transmission instance of the set of transmissions instances is configured in each sub-band of the set of sub-bands. The operations of 1605 may be performed according to the methods described herein. In some examples, aspects of the operations of 1605 may be performed by a configuration component as described with reference to FIGS. 9 through 12.

At 1610, the base station may transmit, to a UE, the set of signals in the set of configured transmission instances, where a first signal of the set of signals is transmitted in a first sub-band of the set of sub-bands and a second signal of the set of signals is transmitted in a second sub-band of the set of sub-bands different from the first sub-band. The operations of 1610 may be performed according to the methods described herein. In some examples, aspects of the operations of 1610 may be performed by a signal component as described with reference to FIGS. 9 through 12.

At 1615, the base station may receive, from the UE, a measurement report including respective information for each sub-band of the set of sub-bands based on the transmitted set of signals. The operations of 1615 may be performed according to the methods described herein. In some examples, aspects of the operations of 1615 may be performed by a report component as described with reference to FIGS. 9 through 12.

At 1620, the base station may determine a set of communication beams for the set of sub-bands based on the measurement report. The operations of 1620 may be performed according to the methods described herein. In some examples, aspects of the operations of 1620 may be performed by a communication beam manager as described with reference to FIGS. 9 through 12.

At 1625, the base station may communicate with the UE in the carrier bandwidth using the set of communication beams, where the communicating uses a first communication beam of the set of communication beams in the first sub-band and the communicating uses a second communication beam of the set of communication beams different from the first communication beam in the second sub-band. The operations of 1625 may be performed according to the methods described herein. In some examples, aspects of the operations of 1625 may be performed by a communication component as described with reference to FIGS. 9 through 12.

The following provides an overview of aspects of the present disclosure:

Aspect 1: A method for wireless communications at a UE, comprising: receiving, from a base station, a plurality of signals across a carrier bandwidth comprising a plurality of sub-bands, wherein a first signal of the plurality of signals is received in a first sub-band of the plurality of sub-bands and a second signal of the plurality of signals is received in a second sub-band of the plurality of sub-bands different from the first sub-band; measuring, for the plurality of signals, a plurality of signal measurement values corresponding to the plurality of sub-bands; determining a plurality of communication beams for the plurality of sub-bands based at least in part on the plurality of signal measurement values, wherein a first communication beam of the plurality of communication beams is determined for the first sub-band and a second communication beam different from the first communication beam is determined for the second sub-band; and communicating with the base station in the carrier bandwidth based at least in part on the determined plurality of communication beams.

Aspect 2: The method of aspect 1, further comprising: comparing a first signal measurement value of the plurality of signal measurement values for the first signal to a second signal measurement value of the plurality of signal measurement values for the second signal; and selecting one or more communication beams of the plurality of communication beams for communicating in the carrier bandwidth based at least in part on the comparing, wherein the communicating with the base station in the carrier bandwidth is further based at least in part on the selected one or more communication beams.

Aspect 3: The method of aspect 2, wherein the comparing comprises: calculating a difference value between the first signal measurement value and the second signal measurement value; and comparing the difference value to a threshold value for beam squint, wherein selecting the one or more communication beams comprises selecting a communication beam for the carrier bandwidth if the difference value fails to satisfy the threshold value for beam squint and selecting the one or more communication beams comprises selecting the plurality of communication beams for the plurality of sub-bands if the difference value satisfies the threshold value for beam squint.

Aspect 4: The method of aspect 3, further comprising: receiving, from the base station, repetitions of the plurality of signals across the carrier bandwidth for a time period; determining that the difference value between the first signal measurement value and the second signal measurement value changes less than a threshold amount during the time period; receiving, from the base station, a repeated first signal in the first sub-band in a subsequent slot; measuring, for the repeated first signal, the first signal measurement value in the subsequent slot; and deriving the second signal measurement value in the subsequent slot based at least in part on the difference value and determining that the difference value changes less than the threshold amount.

Aspect 5: The method of any of aspects 1 through 4, further comprising: receiving, from the base station, a configuration message indicating for the UE to communicate using sub-band-specific communication beams; and selecting the plurality of communication beams for communicating in the plurality of sub-bands of the carrier bandwidth based at least in part on the configuration message.

Aspect 6: The method of aspect 5, wherein the configuration message comprises a radio resource control message, a medium access control control element, a downlink control information message, or a combination thereof.

Aspect 7: The method of any of aspects 1 through 6, further comprising: transmitting, to the base station, a measurement report comprising respective information for each sub-band of the plurality of sub-bands based at least in part on the determined plurality of communication beams for the plurality of sub-bands.

Aspect 8: The method of aspect 7, wherein the measurement report comprises a preferred communication beam for each sub-band of the plurality of sub-bands, an order of preference for communication beams for each sub-band of the plurality of sub-bands, a preferred communication beam for one or more combinations of sub-bands of the plurality of sub-bands, an order of preference for communication beams for one or more combinations of sub-bands of the plurality of sub-bands, an order of preference for communication beams for the carrier bandwidth, an order of preference for the plurality of sub-bands, or a combination thereof.

Aspect 9: The method of any of aspects 1 through 8, further comprising: receiving, from the base station, a configuration message indicating the plurality of sub-bands configured for the carrier bandwidth, wherein determining the plurality of communication beams is based at least in part on the plurality of sub-bands configured for the carrier bandwidth.

Aspect 10: The method of any of aspects 1 through 9, further comprising: selecting, from the determined plurality of communication beams, a subset of communication beams for communicating on a plurality of physical channels, wherein the first communication beam is selected for a first physical channel of the plurality of physical channels and the second communication beam is selected for a second physical channel of the plurality of physical channels.

Aspect 11: The method of aspect 10, further comprising: identifying a resource occasion configured for a physical channel of the plurality of physical channels, wherein a communication beam is selected for the physical channel based at least in part on the resource occasion configured for the physical channel and a sub-band of the plurality of sub-bands corresponding to the resource occasion.

Aspect 12: The method of aspect 11, wherein the resource occasion is identified for the physical channel based at least in part on remaining minimum system information, other system information, or a combination thereof; and the physical channel comprises a physical control channel, a physical data channel, a physical random access channel, a physical feedback channel, or a combination thereof.

Aspect 13: The method of any of aspects 1 through 12, wherein the plurality of signals comprises a plurality of synchronization signal blocks; the receiving further comprises: receiving a plurality of sets of synchronization signal block beams across the carrier bandwidth using a set of receive beams, wherein a first set of synchronization signal block beams of the plurality of sets of synchronization signal block beams is received in the first sub-band and a second set of synchronization signal block beams of the plurality of sets of synchronization signal block beams is received in the second sub-band; and the determining further comprises: selecting a receive beam of the set of receive beams for each synchronization signal block beam of the plurality of sets of synchronization signal block beams for each sub-band of the plurality of sub-bands.

Aspect 14: The method of aspect 13, wherein the communicating further comprises: communicating with the base station in the carrier bandwidth using a sub-band-specific receive beam of the set of receive beams, a sub-band-specific synchronization signal block beam of the plurality of sets of synchronization signal block beams, or a combination thereof based at least in part on the selecting.

Aspect 15: The method of any of aspects 13 through 14, wherein a first synchronization signal block sequence for the first set of synchronization signal block beams received in the first sub-band is the same as a second synchronization signal block sequence for the second set of synchronization signal block beams received in the second sub-band.

Aspect 16: The method of any of aspects 13 through 14, wherein a first synchronization signal block sequence for the first set of synchronization signal block beams received in the first sub-band is different from a second synchronization signal block sequence for the second set of synchronization signal block beams received in the second sub-band.

Aspect 17: The method of aspect 16, wherein the first synchronization signal block sequence is based at least in part on the first sub-band; and the second synchronization signal block sequence is based at least in part on the second sub-band.

Aspect 18: The method of any of aspects 13 through 17, further comprising: monitoring for the plurality of sets of synchronization signal block beams across the carrier bandwidth based at least in part on one or more raster frequencies for the carrier bandwidth, wherein receiving the plurality of sets of synchronization signal block beams is based at least in part on the monitoring.

Aspect 19: The method of any of aspects 13 through 18, further comprising: identifying the plurality of sub-bands based at least in part on the received plurality of sets of synchronization signal block beams, wherein determining the plurality of communication beams is based at least in part on the identified plurality of sub-bands.

Aspect 20: The method of any of aspects 1 through 19, wherein the plurality of signals comprises a plurality of channel state information reference signals.

Aspect 21: The method of aspect 20, wherein the receiving further comprises: receiving a plurality of sets of channel state information reference signals across the carrier bandwidth using a receive beam, wherein a first set of channel state information reference signals of the plurality of sets of channel state information reference signals is received in the first sub-band from a set of transmit beams at the base station and a second set of channel state information reference signals of the plurality of sets of channel state information reference signals is received in the second sub-band from the set of transmit beams at the base station; and the determining further comprises: selecting a plurality of transmit beams of the set of transmit beams for the plurality of sub-bands, wherein the method further comprises: transmitting, to the base station and based at least in part on the selecting, a report message comprising a preferred transmit beam at the base station for each sub-band of the plurality of sub-bands, an order of preference for transmit beams at the base station for each sub-band of the plurality of sub-bands, a transmit beam at the base station for the carrier bandwidth, an order of preference for the plurality of sub-bands, or a combination thereof.

Aspect 22: The method of aspect 20, wherein the receiving further comprises: receiving the plurality of channel state information reference signals across the carrier bandwidth using a set of receive beams, wherein a first channel state information reference signal of the plurality of channel state information reference signals is received in the first sub-band using the set of receive beams and a second channel state information reference signal of the plurality of channel state information reference signals is received in the second sub-band using the set of receive beams; and the determining further comprises: selecting a plurality of receive beams of the set of receive beams for the plurality of sub-bands, wherein the communicating with the base station in the carrier bandwidth is further based at least in part on the selecting.

Aspect 23: The method of aspect 22, further comprising: transmitting, to the base station and based at least in part on the selecting, a report message comprising a preferred sub-band of the plurality of sub-bands, an order of preference for the plurality of sub-bands, or a combination thereof.

Aspect 24: The method of any of aspects 1 through 23, further comprising: determining a plurality of repetition cadences for receiving the plurality of signals across the carrier bandwidth, wherein the first signal and a repeated first signal are received in the first sub-band according to a first repetition cadence of the plurality of repetition cadences and the second signal and a repeated second signal are received in the second sub-band according to a second repetition cadence of the plurality of repetition cadences different from the first repetition cadence.

Aspect 25: The method of any of aspects 1 through 24, further comprising: monitoring for a plurality of synchronization signal block beams from one or more neighboring base stations, wherein the monitoring comprises monitoring for a first set of synchronization signal block beams in the first sub-band and monitoring for a second set of synchronization signal block beams in the second sub-band, monitoring for the plurality of synchronization signal block beams in a specific sub-band of the carrier bandwidth, determining a monitoring configuration based at least in part on a trigger event, or a combination thereof.

Aspect 26: The method of any of aspects 1 through 25, further comprising: transmitting, to the base station, a report message comprising a plurality of transmission configuration indicator states corresponding to the plurality of sub-bands, wherein the report message comprises a first transmission configuration indicator state of the plurality of transmission configuration indicator states for the first sub-band and a second transmission configuration indicator state of the plurality of transmission configuration indicator states different from the first transmission configuration indicator state for the second sub-band.

Aspect 27: The method of any of aspects 1 through 26, wherein the first signal and the second signal are received concurrently in the first sub-band and the second sub-band.

Aspect 28: A method for wireless communications at a base station, comprising: configuring a plurality of transmissions instances for a plurality of signals across a carrier bandwidth comprising a plurality of sub-bands, wherein at least one transmission instance of the plurality of transmissions instances is configured in each sub-band of the plurality of sub-bands; transmitting, to a UE, the plurality of signals in the plurality of configured transmission instances, wherein a first signal of the plurality of signals is transmitted in a first sub-band of the plurality of sub-bands and a second signal of the plurality of signals is transmitted in a second sub-band of the plurality of sub-bands different from the first sub-band; and communicating with the UE in the carrier bandwidth using a plurality of communication beams for the plurality of sub-bands based at least in part on the transmitted plurality of signals, wherein the communicating uses a first communication beam of the plurality of communication beams in the first sub-band and the communicating uses a second communication beam of the plurality of communication beams different from the first communication beam in the second sub-band.

Aspect 29: The method of aspect 28, further comprising: transmitting, to the UE, a configuration message indicating for the UE to communicate using sub-band-specific communication beams, wherein the communicating in the carrier bandwidth using the plurality of communication beams is based at least in part on the configuration message.

Aspect 30: The method of any of aspects 28 through 29, further comprising: receiving, from the UE, a measurement report comprising respective information for each sub-band of the plurality of sub-bands based at least in part on the transmitted plurality of signals; and determining the plurality of communication beams for the plurality of sub-bands based at least in part on the measurement report.

Aspect 31: The method of aspect 30, wherein the measurement report comprises a preferred communication beam for each sub-band of the plurality of sub-bands, an order of preference for communication beams for each sub-band of the plurality of sub-bands, a preferred communication beam for one or more combinations of sub-bands of the plurality of sub-bands, an order of preference for communication beams for one or more combinations of sub-bands of the plurality of sub-bands, an order of preference for communication beams for the carrier bandwidth, an order of preference for the plurality of sub-bands, or a combination thereof.

Aspect 32: The method of any of aspects 28 through 31, further comprising: configuring the plurality of sub-bands for the carrier bandwidth, wherein configuring the plurality of transmissions instances is based at least in part on the configured plurality of sub-bands for the carrier bandwidth; and transmitting, to the UE, a configuration message indicating the configured plurality of sub-bands for the carrier bandwidth.

Aspect 33: The method of any of aspects 28 through 31, further comprising: identifying the plurality of sub-bands based at least in part on the configured plurality of transmissions instances.

Aspect 34: The method of any of aspects 28 through 33, wherein the plurality of signals comprises a plurality of synchronization signal blocks; and the transmitting further comprises: transmitting a plurality of sets of synchronization signal block beams across the carrier bandwidth, wherein a first set of synchronization signal block beams of the plurality of sets of synchronization signal block beams is transmitted in the first sub-band and a second set of synchronization signal block beams of the plurality of sets of synchronization signal block beams is transmitted in the second sub-band.

Aspect 35: The method of aspect 34, further comprising: configuring a set of resource occasions for a set of physical channels for the UE, wherein one or more synchronization signal blocks of the plurality of synchronization signal blocks indicate the set of resource occasions for the set of physical channels.

Aspect 36: The method of aspect 34, further comprising: configuring a plurality of sets of resource occasions for a set of physical channels for the UE, wherein the first set of synchronization signal block beams indicates a first set of resource occasions of the plurality of sets of resource occasions for the set of physical channels and the second set of synchronization signal block beams indicates a second set of resource occasions of the plurality of sets of resource occasions different from the first set of resource occasions for the set of physical channels.

Aspect 37: The method of any of aspects 34 through 36, further comprising: determining a first group of synchronization signal block beams and a second group of synchronization signal block beams based at least in part on an antenna array configuration for the base station, wherein the first group of synchronization signal block beams comprises the plurality of sets of synchronization signal block beams; transmitting, to the UE, a system information message indicating the first group of synchronization signal block beams to receive across the carrier bandwidth; and transmitting the second group of synchronization signal block beams in a specific sub-band of the plurality of sub-bands for the carrier bandwidth.

Aspect 38: The method of any of aspects 28 through 37, wherein the plurality of signals comprises a plurality of channel state information reference signals; and the transmitting further comprises: transmitting a plurality of sets of channel state information reference signals across the carrier bandwidth using a set of transmit beams, wherein a first set of channel state information reference signals of the plurality of sets of channel state information reference signals is transmitted in the first sub-band using the set of transmit beams and a second set of channel state information reference signals of the plurality of sets of channel state information reference signals is transmitted in the second sub-band using the set of transmit beams, the method further comprising: receiving, from the UE, a report message comprising a preferred transmit beam of the set of transmit beams for each sub-band of the plurality of sub-bands, an order of preference for the set of transmit beams for each sub-band of the plurality of sub-bands, a transmit beam of the set of transmit beams for the carrier bandwidth, an order of preference for the plurality of sub-bands, or a combination thereof.

Aspect 39: The method of any of aspects 28 through 37, wherein the plurality of signals comprises a plurality of channel state information reference signals; and the transmitting further comprises: transmitting a plurality of channel state information reference signals across the carrier bandwidth using a transmit beam, wherein a first channel state information reference signal of the plurality of channel state information reference signals is transmitted in the first sub-band using the transmit beam and a second channel state information reference signal of the plurality of channel state information reference signals is transmitted in the second sub-band using the transmit beam, the method further comprising: receiving, from the UE, a report message comprising a preferred sub-band of the plurality of sub-bands, an order of preference for the plurality of sub-bands, or a combination thereof.

Aspect 40: The method of any of aspects 28 through 39, further comprising: receiving, from the UE and based at least in part on the transmitted plurality of signals, a report message comprising a plurality of transmission configuration indicator states corresponding to the plurality of sub-bands, wherein the report message comprises a first transmission configuration indicator state of the plurality of transmission configuration indicator states for the first sub-band and a second transmission configuration indicator state of the plurality of transmission configuration indicator states different from the first transmission configuration indicator state for the second sub-band.

Aspect 41: An apparatus for wireless communications at a UE, comprising a processor; memory coupled with the processor; and instructions stored in the memory and executable by the processor to cause the apparatus to perform a method of any of aspects 1 through 27.

Aspect 42: An apparatus for wireless communications at a UE, comprising at least one means for performing a method of any of aspects 1 through 27.

Aspect 43: A non-transitory computer-readable medium storing code for wireless communications at a UE, the code comprising instructions executable by a processor to perform a method of any of aspects 1 through 27.

Aspect 44: An apparatus for wireless communications at a base station, comprising a processor; memory coupled with the processor; and instructions stored in the memory and executable by the processor to cause the apparatus to perform a method of any of aspects 28 through 40.

Aspect 45: An apparatus for wireless communications at a base station, comprising at least one means for performing a method of any of aspects 28 through 40.

Aspect 46: A non-transitory computer-readable medium storing code for wireless communications at a base station, the code comprising instructions executable by a processor to perform a method of any of aspects 28 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions discussed above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, at the UE from a network entity, a configuration message indicating a plurality of resources for a plurality of sub-bands configured for a carrier bandwidth;
    receiving, at the UE from the network entity, a plurality of reference signals across the carrier bandwidth comprising the plurality of sub-bands, wherein a first reference signal of the plurality of reference signals is received in a first sub-band of the plurality of sub-bands and a second reference signal of the plurality of reference signals is received in a second sub-band of the plurality of sub-bands different from the first sub-band, and wherein the first reference signal and the second reference signal at least partially overlap in time;
    measuring, for the plurality of reference signals, a plurality of signal measurement values corresponding to the plurality of sub-bands;
    determining a plurality of communication beams for the plurality of sub-bands based at least in part on the plurality of signal measurement values, wherein a first communication beam of the plurality of communication beams is determined for the first sub-band and a second communication beam different from the first communication beam is determined for the second sub-band; and
    communicating with the network entity in the carrier bandwidth based at least in part on the determined plurality of communication beams.

2. The method of claim 1, further comprising:
    comparing a first signal measurement value of the plurality of signal measurement values for the first reference signal to a second signal measurement value of the plurality of signal measurement values for the second reference signal; and
    selecting one or more communication beams of the plurality of communication beams for communicating in the carrier bandwidth based at least in part on the comparing, wherein the communicating with the network entity in the carrier bandwidth is further based at least in part on the selected one or more communication beams.

3. The method of claim 2, wherein the comparing comprises:
    calculating a difference value between the first signal measurement value and the second signal measurement value; and
    comparing the difference value to a threshold value for beam squint, wherein selecting the one or more communication beams comprises selecting a communication beam for the carrier bandwidth if the difference value fails to satisfy the threshold value for beam squint and selecting the one or more communication beams comprises selecting the plurality of communication beams for the plurality of sub-bands if the difference value satisfies the threshold value for beam squint.

4. The method of claim 3, further comprising:
    receiving, from the network entity, repetitions of the plurality of reference signals across the carrier bandwidth for a time period;
    determining that the difference value between the first signal measurement value and the second signal measurement value changes less than a threshold amount during the time period;
    receiving, from the network entity, a repeated first reference signal in the first sub-band in a subsequent slot;
    measuring, for the repeated first reference signal, the first signal measurement value in the subsequent slot; and
    deriving the second signal measurement value in the subsequent slot based at least in part on the difference value and determining that the difference value changes less than the threshold amount.

5. The method of claim 1, further comprising:
    receiving, as part of the configuration message, an indication for the UE to communicate using sub-band-specific communication beams; and
    selecting the plurality of communication beams for communicating in the plurality of sub-bands of the carrier bandwidth based at least in part on the configuration message.

6. The method of claim 5, wherein the configuration message comprises a radio resource control message, a medium access control control element, a downlink control information message, or a combination thereof.

7. The method of claim 1, further comprising:
    transmitting, to the network entity, a measurement report comprising respective information for each sub-band of the plurality of sub-bands based at least in part on the determined plurality of communication beams for the plurality of sub-bands.

8. The method of claim 7, wherein the measurement report comprises a preferred communication beam for each sub-band of the plurality of sub-bands, an order of preference for communication beams for each sub-band of the plurality of sub-bands, a preferred communication beam for one or more combinations of sub-bands of the plurality of sub-bands, an order of preference for communication beams for one or more combinations of sub-bands of the plurality of sub-bands, an order of preference for communication beams for the carrier bandwidth, an order of preference for the plurality of sub-bands, or a combination thereof.

9. The method of claim 1,
    wherein determining the plurality of communication beams is based at least in part on the plurality of sub-bands configured for the carrier bandwidth.

10. The method of claim 1, further comprising:
    selecting, from the determined plurality of communication beams, a subset of communication beams for communicating on a plurality of physical channels, wherein the first communication beam is selected for a first physical channel of the plurality of physical channels and the second communication beam is selected for a second physical channel of the plurality of physical channels.

11. The method of claim 10, further comprising:
    identifying a resource occasion configured for a physical channel of the plurality of physical channels, wherein a communication beam is selected for the physical channel based at least in part on the resource occasion configured for the physical channel and a sub-band of the plurality of sub-bands corresponding to the resource occasion.

12. The method of claim 11, wherein:
the resource occasion is identified for the physical channel based at least in part on remaining minimum system information, other system information, or a combination thereof; and
the physical channel comprises a physical control channel, a physical data channel, a physical random access channel, a physical feedback channel, or a combination thereof.

13. The method of claim 1, wherein:
the plurality of reference signals comprises a plurality of synchronization signal blocks, the receiving further comprises:
receiving a plurality of sets of synchronization signal block beams across the carrier bandwidth using a set of receive beams, wherein a first set of synchronization signal block beams of the plurality of sets of synchronization signal block beams is received in the first sub-band and a second set of synchronization signal block beams of the plurality of sets of synchronization signal block beams is received in the second sub-band; and
the determining further comprises:
selecting a receive beam of the set of receive beams for each synchronization signal block beam of the plurality of sets of synchronization signal block beams for each sub-band of the plurality of sub-bands.

14. The method of claim 13, wherein the communicating further comprises:
communicating with the network entity in the carrier bandwidth using a sub-band-specific receive beam of the set of receive beams, a sub-band-specific synchronization signal block beam of the plurality of sets of synchronization signal block beams, or a combination thereof based at least in part on the selecting.

15. The method of claim 13, wherein a first synchronization signal block sequence for the first set of synchronization signal block beams received in the first sub-band is the same as a second synchronization signal block sequence for the second set of synchronization signal block beams received in the second sub-band.

16. The method of claim 13, wherein a first synchronization signal block sequence for the first set of synchronization signal block beams received in the first sub-band is different from a second synchronization signal block sequence for the second set of synchronization signal block beams received in the second sub-band.

17. The method of claim 16, wherein:
the first synchronization signal block sequence is based at least in part on the first sub-band; and
the second synchronization signal block sequence is based at least in part on the second sub-band.

18. The method of claim 13, further comprising:
monitoring for the plurality of sets of synchronization signal block beams across the carrier bandwidth based at least in part on one or more raster frequencies for the carrier bandwidth, wherein receiving the plurality of sets of synchronization signal block beams is based at least in part on the monitoring.

19. The method of claim 13, further comprising:
identifying the plurality of sub-bands based at least in part on the received plurality of sets of synchronization signal block beams, wherein determining the plurality of communication beams is based at least in part on the identified plurality of sub-bands.

20. The method of claim 1, wherein the plurality of reference signals comprises a plurality of channel state information reference signals.

21. The method of claim 20, wherein:
the receiving further comprises:
receiving a plurality of sets of channel state information reference signals across the carrier bandwidth using a receive beam, wherein a first set of channel state information reference signals of the plurality of sets of channel state information reference signals is received in the first sub-band from a set of transmit beams at the network entity and a second set of channel state information reference signals of the plurality of sets of channel state information reference signals is received in the second sub-band from the set of transmit beams at the network entity; and
the determining further comprises:
selecting a plurality of transmit beams of the set of transmit beams for the plurality of sub-bands,
wherein the method further comprises:
transmitting, to the network entity and based at least in part on the selecting, a report message comprising a preferred transmit beam at the network entity for each sub-band of the plurality of sub-bands, an order of preference for transmit beams at the network entity for each sub-band of the plurality of sub-bands, a transmit beam at the network entity for the carrier bandwidth, an order of preference for the plurality of sub-bands, or a combination thereof.

22. The method of claim 20, wherein:
the receiving further comprises:
receiving the plurality of channel state information reference signals across the carrier bandwidth using a set of receive beams, wherein a first channel state information reference signal of the plurality of channel state information reference signals is received in the first sub-band using the set of receive beams and a second channel state information reference signal of the plurality of channel state information reference signals is received in the second sub-band using the set of receive beams; and
the determining further comprises:
selecting a plurality of receive beams of the set of receive beams for the plurality of sub-bands, wherein the communicating with the network entity in the carrier bandwidth is further based at least in part on the selecting.

23. The method of claim 22, further comprising:
transmitting, to the network entity and based at least in part on the selecting, a report message comprising a preferred sub-band of the plurality of sub-bands, an order of preference for the plurality of sub-bands, or a combination thereof.

24. The method of claim 1, further comprising:
determining a plurality of repetition cadences for receiving the plurality of reference signals across the carrier bandwidth, wherein the first reference signal and a repeated first reference signal are received in the first sub-band according to a first repetition cadence of the plurality of repetition cadences and the second reference signal and a repeated second reference signal are received in the second sub-band according to a second repetition cadence of the plurality of repetition cadences different from the first repetition cadence.

25. The method of claim 1, further comprising:
monitoring for a plurality of synchronization signal block beams from one or more neighboring network entities, wherein the monitoring comprises monitoring for a first set of synchronization signal block beams in the first sub-band and monitoring for a second set of synchronization signal block beams in the second sub-band, monitoring for the plurality of synchronization signal block beams in a specific sub-band of the carrier bandwidth, determining a monitoring configuration based at least in part on a trigger event, or a combination thereof.

26. The method of claim 1, further comprising:
transmitting, to the network entity, a report message comprising a plurality of transmission configuration indicator states corresponding to the plurality of sub-bands, wherein the report message comprises a first transmission configuration indicator state of the plurality of transmission configuration indicator states for the first sub-band and a second transmission configuration indicator state of the plurality of transmission configuration indicator states different from the first transmission configuration indicator state for the second sub-band.

27. The method of claim 1, wherein the first reference signal and the second reference signal are received concurrently in the first sub-band and the second sub-band.

28. A method for wireless communications at a network entity, comprising:
configuring a plurality of transmissions instances for a plurality of reference signals across a carrier bandwidth comprising a plurality of sub-bands, wherein at least one transmission instance of the plurality of transmissions instances is configured in each sub-band of the plurality of sub-bands;
transmitting, from the network entity to a user equipment (UE), a configuration message indicating a plurality of resources for the plurality of sub-bands configured for the carrier bandwidth;
transmitting, from the network entity to the UE, the plurality of reference signals in the plurality of configured transmission instances, wherein a first reference signal of the plurality of reference signals is transmitted in a first sub-band of the plurality of sub-bands and a second reference signal of the plurality of reference signals is transmitted in a second sub-band of the plurality of sub-bands different from the first sub-band, and wherein the first reference signal and the second reference signal at least partially overlap in time; and
communicating with the UE in the carrier bandwidth using a plurality of communication beams for the plurality of sub-bands based at least in part on the transmitted plurality of reference signals, wherein the communicating uses a first communication beam of the plurality of communication beams in the first sub-band and the communicating uses a second communication beam of the plurality of communication beams different from the first communication beam in the second sub-band.

29. An apparatus for wireless communications at a user equipment (UE), comprising:
a processor;
memory coupled with the processor; and
instructions stored in the memory and executable by the processor to cause the apparatus to:
receive, at the UE from a network entity, a configuration message indicating a plurality of resources for a plurality of sub-bands configured for a carrier bandwidth;
receive, at the UE from the network entity, a plurality of reference signals across the carrier bandwidth comprising the plurality of sub-bands, wherein a first reference signal of the plurality of reference signals is received in a first sub-band of the plurality of sub-bands and a second reference signal of the plurality of reference signals is received in a second sub-band of the plurality of sub-bands different from the first sub-band, and wherein the first reference signal and the second reference signal at least partially overlap in time;
measure, for the plurality of reference signals, a plurality of signal measurement values corresponding to the plurality of sub-bands;
determine a plurality of communication beams for the plurality of sub-bands based at least in part on the plurality of signal measurement values, wherein a first communication beam of the plurality of communication beams is determined for the first sub-band and a second communication beam different from the first communication beam is determined for the second sub-band; and
communicate with the network entity in the carrier bandwidth based at least in part on the determined plurality of communication beams.

30. An apparatus for wireless communications at a network entity, comprising:
a processor;
memory coupled with the processor; and
instructions stored in the memory and executable by the processor to cause the apparatus to:
configure a plurality of transmissions instances for a plurality of reference signals across a carrier bandwidth comprising a plurality of sub-bands, wherein at least one transmission instance of the plurality of transmissions instances is configured in each sub-band of the plurality of sub-bands;
transmit, from the network entity to a user equipment (UE), a configuration message indicating a plurality of resources for the plurality of sub-bands configured for the carrier bandwidth;
transmit, from the network entity to the UE, the plurality of reference signals in the plurality of configured transmission instances, wherein a first reference signal of the plurality of reference signals is transmitted in a first sub-band of the plurality of sub-bands and a second reference signal of the plurality of reference signals is transmitted in a second sub-band of the plurality of sub-bands different from the first sub-band, and wherein the first reference signal and the second reference signal at least partially overlap in time; and
communicate with the UE in the carrier bandwidth using a plurality of communication beams for the plurality of sub-bands based at least in part on the transmitted plurality of reference signals, wherein the communicating uses a first communication beam of the plurality of communication beams in the first sub-band and the communicating uses a second communication beam of the plurality of communication beams different from the first communication beam in the second sub-band.

* * * * *